(12) United States Patent
Khoyilar et al.

(10) Patent No.: US 10,679,239 B2
(45) Date of Patent: Jun. 9, 2020

(54) DATA INTEGRATION AND ANALYSIS OF GEOLOCATION DATA FROM AN ELECTRONIC FILE

(71) Applicant: AnyQpon Inc., Newport Coast, CA (US)

(72) Inventors: Michael Khoyilar, Newport Coast, CA (US); Piotr Szreder, San Diego, CA (US)

(73) Assignee: AnyQpon Inc., Newport Coast, CA (US)

( * ) Notice: Subject to any disclaimer, the term of this patent is extended or adjusted under 35 U.S.C. 154(b) by 0 days.

(21) Appl. No.: 16/244,463

(22) Filed: Jan. 10, 2019

(65) Prior Publication Data

US 2019/0213626 A1    Jul. 11, 2019

Related U.S. Application Data

(60) Provisional application No. 62/616,292, filed on Jan. 11, 2018.

(51) Int. Cl.
| | |
|---|---|
| *G06Q 30/02* | (2012.01) |
| *H04W 4/80* | (2018.01) |
| *G06Q 20/38* | (2012.01) |
| *G06F 16/14* | (2019.01) |

(52) U.S. Cl.
CPC ........ *G06Q 30/0239* (2013.01); *G06F 16/144* (2019.01); *G06Q 20/387* (2013.01); *H04W 4/80* (2018.02)

(58) Field of Classification Search
CPC .................................................... G06Q 30/02
See application file for complete search history.

(56) References Cited

U.S. PATENT DOCUMENTS

| | | |
|---|---|---|
| 5,642,485 A | 6/1997 | Deaton et al. |
| 5,644,723 A | 7/1997 | Deaton et al. |
| 5,649,114 A | 7/1997 | Deaton et al. |
| 5,687,322 A | 11/1997 | Deaton et al. |
| 6,334,108 B1 | 12/2001 | Deaton et al. |

(Continued)

OTHER PUBLICATIONS

Hui, Sam, et al: "The Effect of In-Store Travel Distance on Unplanned Spending: Applications to Mobile Promotion Strategies." Journal of American Marketing Association, 2013. Document attached. (Year: 2013).*

(Continued)

*Primary Examiner* — Katherine Kolosowski-Gager
(74) *Attorney, Agent, or Firm* — Knobbe, Martens, Olson & Bear, LLP

(57) ABSTRACT

Described herein are systems and methods that facilitate the delivery of targeting campaigns that provide a personalized shopper-vendor experience. The targeting campaigns can include dynamically determining rates for discounts and/or vouchers for improved targeting. The targeting campaigns can include a single platform for suppliers, consumers, and producers, instead of providing separate platforms in traditional targeting campaigns that facilitate communication to and from shoppers and vendors (e.g. content item providers). As such, the dynamic voucher generation and distribution system can maximize sharing of relevant coupons and vendor promotions to consumers, and match the consumer's unique needs with customized discounts.

13 Claims, 26 Drawing Sheets

(56) References Cited

U.S. PATENT DOCUMENTS

| | | |
|---|---|---|
| 6,377,935 B1 | 4/2002 | Deaton et al. |
| 6,415,262 B1 | 7/2002 | Walker et al. |
| 6,424,949 B1 | 7/2002 | Deaton et al. |
| 6,516,302 B1 | 2/2003 | Deaton et al. |
| 6,609,104 B1 | 8/2003 | Deaton et al. |
| 6,611,811 B1 | 8/2003 | Deaton et al. |
| 6,684,195 B1 | 1/2004 | Deaton et al. |
| 6,687,679 B1 | 2/2004 | Van Luchene et al. |
| 7,194,423 B2 | 3/2007 | Walker et al. |
| 7,240,021 B1 | 7/2007 | Walker et al. |
| 7,406,438 B2 | 7/2008 | Walker et al. |
| 7,593,862 B2 | 9/2009 | Mankoff et al. |
| 7,870,021 B2 | 1/2011 | Mankoff et al. |
| 8,036,934 B2 | 10/2011 | Mankoff et al. |
| 8,140,386 B2 | 3/2012 | Mankoff et al. |
| 8,244,580 B2 | 8/2012 | Mankoff et al. |
| 8,467,807 B1 | 6/2013 | Dalit et al. |
| RE45,006 E | 7/2014 | Deaton et al. |
| 8,825,522 B2 | 9/2014 | Mankoff |
| 9,258,296 B2 | 2/2016 | Juthani |
| 9,600,674 B2 | 3/2017 | Coffing et al. |
| 2003/0004802 A1 | 1/2003 | Callegari |
| 2003/0154125 A1 | 8/2003 | Mittal et al. |
| 2005/0071230 A1 | 3/2005 | Mankoff |
| 2005/0075932 A1 | 4/2005 | Mankoff |
| 2006/0223505 A1* | 10/2006 | Starr .................. G06Q 30/02 455/414.1 |
| 2007/0130016 A1 | 6/2007 | Walker et al. |
| 2008/0033816 A1 | 2/2008 | Miller et al. |
| 2008/0065484 A1 | 3/2008 | Miller et al. |
| 2008/0262920 A1 | 10/2008 | O'Neill et al. |
| 2009/0018919 A1 | 1/2009 | Walker et al. |
| 2009/0117883 A1 | 5/2009 | Coffing et al. |
| 2010/0042476 A1 | 2/2010 | Gauri |
| 2011/0153407 A1 | 6/2011 | Walker et al. |
| 2011/0231238 A1 | 9/2011 | Khan et al. |
| 2012/0109752 A1 | 5/2012 | Strutton et al. |
| 2013/0090957 A1 | 4/2013 | Popkey et al. |
| 2013/0268357 A1 | 10/2013 | Heath |
| 2013/0268364 A1 | 10/2013 | Gildfind |
| 2013/0268365 A1 | 10/2013 | Gildfind |
| 2013/0297416 A1 | 11/2013 | Dipaola et al. |
| 2014/0108260 A1 | 4/2014 | Poole et al. |
| 2014/0156368 A1 | 6/2014 | Wen et al. |
| 2014/0164120 A1* | 6/2014 | Payne ................ G06Q 30/0261 705/14.58 |
| 2014/0172535 A1 | 6/2014 | Matthews |
| 2014/0229323 A1 | 8/2014 | Or et al. |
| 2014/0279015 A1 | 9/2014 | Root et al. |
| 2014/0297406 A1 | 10/2014 | Manning et al. |
| 2014/0324566 A1 | 10/2014 | Mankoff |
| 2015/0193784 A1 | 7/2015 | Gao et al. |
| 2015/0193791 A1 | 7/2015 | Gao et al. |
| 2015/0254704 A1* | 9/2015 | Kothe .................... G06Q 30/06 705/14.26 |
| 2015/0269607 A1 | 9/2015 | Steube et al. |
| 2015/0310475 A1 | 10/2015 | Feldman |
| 2015/0317654 A1 | 11/2015 | Unser et al. |
| 2015/0348219 A1 | 12/2015 | Unser et al. |
| 2016/0066140 A1* | 3/2016 | Gnanasekaran .... G06F 16/9537 455/456.3 |
| 2016/0189174 A1 | 6/2016 | Heath |
| 2016/0321635 A1 | 11/2016 | Gao et al. |
| 2017/0032288 A1 | 2/2017 | Popkey et al. |
| 2017/0103408 A1 | 4/2017 | Mazuera |
| 2017/0169463 A1 | 6/2017 | Couvillon et al. |

OTHER PUBLICATIONS

Gasparetti et al; Personalization and context awareness in social local search: State of the art and future research challenges. Pervasis and Mobile Computing; vol. 38 Part 2 Jul. 2017. (Year: 2017).*

* cited by examiner

DATA INTEGRATION AND ANALYSIS OF GEOLOCATION DATA FROM AN ELECTRONIC FILE

TECHNICAL FIELD

The present disclosure relates to systems and techniques for data integration, analysis, and distribution, and more specifically for data integration of geolocation data accessible from a downloadable electronic file on a computing device.

DETAILED DESCRIPTION

Overview

Figure 1A:
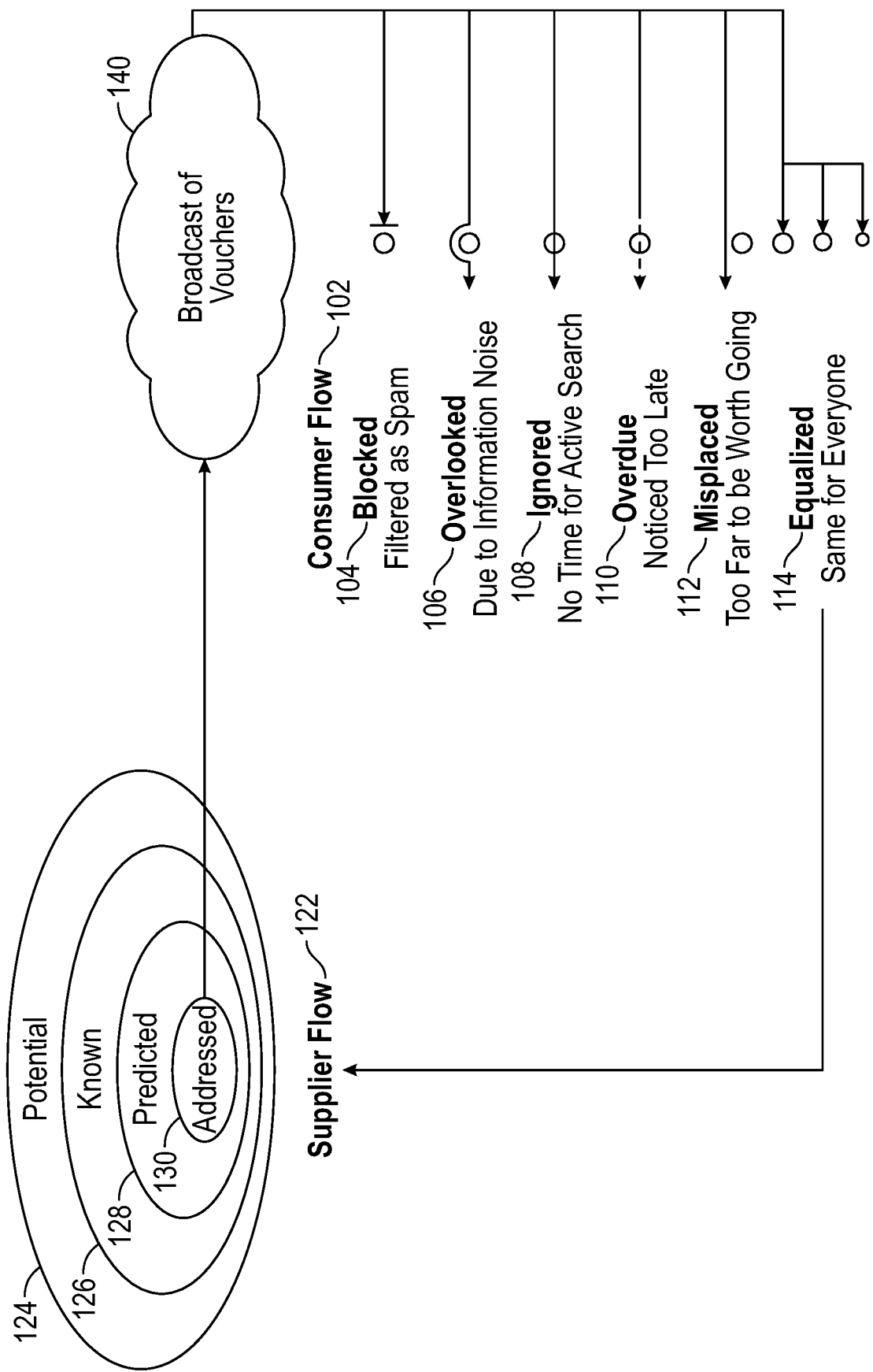
FIG. 1A illustrates an example of a traditional process for producing, targeting, and broadcasting digital or paper vouchers in a traditional targeting campaign.

Some embodiments can include a method for data integration of geolocation information of a mobile computing device from a downloadable electronic file, the method comprising: providing a first downloadable electronic file to a mobile computing device for installation on the mobile computing device, wherein the mobile computing device includes a global positioning system; receiving an indication of completion for the installation of the first downloadable electronic file on the mobile computing device; receiving, from the first downloadable electronic file, a geolocation of the mobile computing device, wherein the first downloadable electronic file receives geolocation data from the global positioning system of the mobile computing device and identifies the geolocation based on the received geolocation data; identifying a list of content provider systems within a threshold radius of the geolocation; accessing content items for the list of content provider systems and corresponding matching rules; accessing a profile for the mobile computing device; and applying the matching rules to the profile to identify one or more matched content items for the mobile computing device.

In the method in any of the preceding paragraphs or any of the methods described herein, the method can further comprise identifying a distance between the geolocation of the mobile computing device and the content provider systems corresponding to each of the matched content items; and adjusting a characteristic of the matched content items based on the identified distance.

In the method in any of the preceding paragraphs or any of the methods described herein, the method can further comprise transmitting the one or more matched content items to the mobile computing device with the adjusted characteristic, wherein the mobile computing device displays a map including a visual indicator of the matched content items and the geolocation of the mobile computing device.

In the method in any of the preceding paragraphs or any of the methods described herein, the method can further comprise receiving an redemption indication of at least one of the one or more matched content items from a second downloadable electronic file installed on the corresponding content provider system, wherein the content provider system receives a signal from the mobile computing device via a near field communication antenna or Bluetooth.

In the method in any of the preceding paragraphs or any of the methods described herein, transmitting the one or more matched content items to the mobile computing device with the adjusted characteristic includes: transmitting the one or more matched content items over a wireless communication channel, and automatically activating the first downloadable electronic file on the mobile computing device to display at least one of the one or more matched content items.

In the method in any of the preceding paragraphs or any of the methods described herein, transmitting the one or more matched content items to the mobile computing device with the adjusted characteristic occurs in substantially real-time of identifying one or more matched content items for the mobile computing device.

In the method in any of the preceding paragraphs or any of the methods described herein, the the one or more matched content items is a voucher.

In the method in any of the preceding paragraphs or any of the methods described herein, the characteristic is a discount amount or a discount percentage.

In the method in any of the preceding paragraphs or any of the methods described herein, adjusting the characteristic is further based on at least one of: a content provider rating, a user of a mobile computing device rating, loyalty points, a voucher referral, a voucher redemption, or a voucher received.

In the method in any of the preceding paragraphs or any of the methods described herein, adjusting the characteristic is further based on a corresponding conversion rate for the identified distance.

In the method in any of the preceding paragraphs or any of the methods described herein, the corresponding conversion rate is retrieved via an API call.

In the method in any of the preceding paragraphs or any of the methods described herein, the map further includes visual indicators of distributed, redeemed, and referred content items, and of reviewed content providers.

Some embodiments include a system for data integration of geolocation information of a mobile computing device from a downloadable electronic file, the system comprising: one or more processors in communication with at least one electronic data store and configured to at least: provide a downloadable electronic file to a mobile computing device for installation on the mobile computing device, wherein the mobile computing device includes a global positioning system; receive an indication of completion for the installation of the downloadable electronic file on the mobile computing device; receive, from the downloadable electronic file, a geolocation of the mobile computing device, wherein the downloadable electronic file receives geolocation data from the global positioning system of the mobile computing device and identifies the geolocation based on the received geolocation data; identify a list of content provider systems within a threshold radius of the geolocation; access content items for the list of content provider systems and corresponding matching rules; access a profile for a user of the mobile computing device; and apply the matching rules to the profile to identify one or more matched content items for the mobile computing device.

In the system in any of the preceding paragraphs or any of the systems described herein, the one or more processors are further configured to identify a distance between the geolocation of the mobile computing device and the content provider systems corresponding to each of the matched content items; and adjust a characteristic of the matched content items based on the identified distance.

In the system in any of the preceding paragraphs or any of the systems described herein, the one or more processors are further configured to transmit the one or more matched content items to the mobile computing device with the adjusted characteristic, wherein the mobile computing device displays a visual indicator of the matched content items and the geolocation of the mobile computing device.

In the system in any of the preceding paragraphs or any of the systems described herein, the one or more processors are further configured to facilitate a payment transaction between the content provider system and the mobile computing device without providing financial information associated with a user of the mobile computing device to the content provider system.

In the system in any of the preceding paragraphs or any of the systems described herein, at least one electronic data store includes a first data store storing call functions for data in a second data store.

In the system in any of the preceding paragraphs or any of the systems described herein, the one or more processors are further configured to display a promotion summary graph of coupons accepted, redeemed, removed, and expired.

In the system in any of the preceding paragraphs or any of the systems described herein, the one or more processors are further configured to display a distribution distance graph of accepted coupons over two or more distances.

In the system in any of the preceding paragraphs or any of the systems described herein, a scanner of the content provider system is configured to scan the one or more matched content items displayed on the mobile computing device.

In the system in any of the preceding paragraphs or any of the systems described herein, at least one of the one or more matched content items include a QR code.

Some embodiments include a non-transitory computer storage medium storing computer-executable instructions that, when executed by a processor, cause the processor to perform the following method: provide a downloadable electronic file to a user computing device for installation on the user computing device, wherein the user computing device includes a global positioning system; receive an indication of completion for the installation of the downloadable electronic file on the user computing device; receive, from the downloadable electronic file, a geolocation of the user computing device, wherein the downloadable electronic file receives geolocation data from the global positioning system of the user computing device and identifies the geolocation based on the received geolocation data; identify a list of content provider systems within a threshold radius of the geolocation; access content items for the list of content provider systems and corresponding matching rules; access a profile associated with the user computing device; and apply the matching rules to the profile to identify one or more matched content items for the user computing device.

In the non-transitory computer storage medium in any of the preceding paragraphs or any of the methods described herein, the method can further comprise the following: identify a distance between the geolocation of the user computing device and the content provider systems corresponding to each of the matched content items; and adjust a characteristic of the matched content items based on the identified distance.

In the non-transitory computer storage medium in any of the preceding paragraphs or any of the methods described herein, the method can further comprise the following: transmit the one or more matched content items to the user computing device with the adjusted characteristic.

In the non-transitory computer storage medium in any of the preceding paragraphs or any of the methods described herein, the matching rules include a query for a type of content item.

In the non-transitory computer storage medium in any of the preceding paragraphs or any of the methods described herein, the method can further comprise the following: receive a request to send one of the matched content items to another user computing device.

Increasing numbers of businesses are using special content items, such as special offers, vouchers (e.g. coupons), loyalty and referral programs, and product or services discounts to attract consumers (e.g. customers). Retailers are providing digital vouchers to users without the need for vouchers to clip or emails to print. Consumers can simply display a voucher on a mobile device or enter a code online to redeem the voucher. Vouchers can include a buy-one-get-one-free or free shipping. Other vouchers can include a percentage discount, a bundling offer, or a free gift. As such, retailers can entice new consumers to a business, as well as re-attract previous consumers.

Described herein are systems and methods that facilitate the delivery of targeted content (e.g., digital vouchers) via a targeting campaign to provide a personalized shopper-vendor experience. The targeting content can include dynamically determining rates for discounts and/or vouchers for improved targeted marketing. The targeting content can include a single platform for suppliers, consumers, and producers, instead of providing separate platforms in traditional targeting campaigns that facilitate communication to and from shoppers and vendors (e.g. content item providers). As such, the dynamic voucher generation and distribution system can maximize sharing of relevant coupons and vendor promotions to consumers, and match the consumer's unique needs with customized discounts.

The dynamic voucher generation and distribution can generate vouchers based on consumer queries. The rates for the vouchers, discounts, bundle options, and/or the like can be customized to a particular consumer and/or a particular merchant based on loyalty and/or referral programs, consumer ratings, supplier ratings, producer ratings, consumer queries and/or transactions, consumer conversion rates, distances from certain locations, and/or the like. For example, the dynamic voucher generation and distribution system can identify a consumer query history for car washes, match with a merchant with available vouchers remaining for the remainder of the month, and push the voucher to the user when the user's geographical location is within a defined distance (e.g., 5 miles) from a car wash. Accordingly, the vouchers can be uniquely customized based on the consumer needs rather than suppliers broadcasting general vouchers to a group of individuals based on a supplier's prediction of a consumer's needs. Moreover, consumers can be incentivized to provide referrals to their friends and family by providing the consumers with points and/or discounts of their own.

In some embodiments, the dynamic voucher generation and distribution system can include infrastructure to facilitate the determination and/or distribution of the dynamically determined voucher. The infrastructure can include one or more of web servers, databases, web API calls, executable software instructions including algorithmic processing, mobile devices, mobile applications, and/or the like. In some embodiments, mobile applications can retrieve geolocation information of a consumer's mobile device. The dynamic voucher generation and distribution system can provide a downloadable electronic file to the consumer's mobile device. The consumer's mobile device can install the downloadable electronic file. Then, the electronic file can access geolocation data from the mobile device's global positioning system to identify a geolocation of the mobile device. The electronic file can transmit the geolocation back to the dynamic voucher generation and distribution system.

In some embodiments, the dynamic voucher generation and distribution system deploys an executable instruction set via a downloadable electronic file by transmitting the executable instruction set to the client device (e.g. a client mobile device). Transmitting the executable instruction set can include pushing the executable instruction set to the client device in the form of an update and/or a downloadable file. Accordingly in some embodiments, the executable instruction set can be downloaded and performed on the client computing device, separate from the dynamic voucher generation and distribution system, to perform the one or more processes on a vouchers and/or voucher related processes. Thus, the executable instruction set can perform the one or more processes locally to the client computing device, enabling faster response time by performing the processes locally and reducing network throughput by reducing and/or eliminating sending data back and forth to the dynamic voucher generation and distribution system. Moreover, the executable file enables the secure retrieving of internet activity data, such as cookie data on the mobile device, that can be used for voucher generation (e.g. a user's online activity indicates a preference for Italian restaurants, and thus, coupons are generated for Italian restaurants). Moreover, sensitive information retrieved at the mobile device can be processed within the mobile device without having to send the sensitive data to and from the dynamic voucher generation and distribution system, thus improving sensitive data security.

In some embodiments, the dynamic voucher generation and distribution system can identify and determine an optimal voucher amount for a consumer based on past conversion performance across various voucher amounts. The dynamic voucher generation and distribution system can retrieve the consumer's historical conversion rate for a particular voucher discount percentage over certain distances, such as a positive conversion for 30% discount at 5 miles but a negative conversion for 20% at 6 miles. The dynamic voucher generation and distribution system can retrieve the consumer's profile information, such as the conversion rates, via API calls to various databases. Accordingly, the dynamic voucher generation and distribution system can dynamically determine a voucher rate (e.g. 30%) based on the profile information. In some embodiments, the dynamic voucher generation and distribution system can determine a content item, such as a voucher, based on a consumer profile and current geolocation (e.g. a higher percentage discount voucher based on a conversion rate at a certain distance and the current distance of the consumer). The dynamic voucher generation and distribution system can then cause the mobile device to display the voucher to the consumer. The notification can be transmitted over a wireless communication channel to activate the installed electronic file (e.g. a mobile application) on the user's mobile device, to cause connection between the electronic file of the remote user mobile device and the dynamic generation and distribution system over the Internet, and to display details of the voucher to the user.

Advantageously, the dynamic generation of the voucher and the automatic distribution of the voucher improves an Internet-centric, technical problem that is rooted in computer technology. In the example of dynamically generating the voucher based on the geolocation relative to the vendor, the user can be immediately notified of a voucher in the nearby vicinity when the voucher is the most relevant to the user. Thus, the user can be alerted of time and/or distance sensitive location when the user is away from a web browser and/or not using the user's mobile phone, providing a practical solution to the technical problem of the user being away from a computing device, such as a home desktop or mobile phone, and/or a user device not specifically using a communication network (such as a user not using the wireless network on the mobile phone).

Traditional platforms separate the supplier targeting campaign and consumer profile, such that a supplier's targeting campaigns are directed to consumer databases that are sometimes accessible, static, and known, and that must be created and maintained/updated. Such separation of the supplier campaign and consumer profile of traditional systems often require suppliers to focus their vouchers to consumers that are known upfront. Suppliers may need to create and maintain consumer database by their own. Such approaches are very cost restrictive for small businesses and even large corporations to reach a reasonably sized audience that can benefit from the promotional campaign. Furthermore, such approaches restrict targeting campaigns to known consumers. New consumers (e.g., new to the area, visitors, tourists, and/or the like) may be missed by suppliers due to the static nature of consumer databases that need to be maintained in order to be current. Advantageously, embodiments of this disclosure include systems and methods that establish a shared/common platform for suppliers to run campaigns and consumers to receive and redeem offers from the suppliers. As such, the shared platform has access to the most up-to-date customer information across multiple supplier channels, thereby providing a solution to the technical problem of database storage of user data. User data in today's internet of things world can be scattered across hundreds of different databases/platforms and quickly outdated. By providing a combined database, the database can aggregate user information, including information of users and vendors, to provide a practical solution of having an up-to-date customer information database for vendors and consumers to use, instead of having to rely on their own database and/or perform collection of data across thousands of databases on their own.

Furthermore, additional challenges may be associated with having to maintain and update consumer information in response to consumer profile changes. Traditional systems often do not update information related to currently known consumers and/or require large amount of processing and/or data transmission to maintain real-time up-to-date consumer information. Finally, such systems focus on gathering large amount of indirect information about the consumer, often without his knowledge (e.g. consumer browsing history) and use complex and computation exhaustive algorithms to determine consumer needs to properly targeting campaign. Such approach requires large amount of storage, computation and bandwidth and thus is costly. On top they must consider legal issues of gathering information about consumers without their consent (e.g. geographic location or browsing history). Advantageously, embodiments of the current disclosure include systems and methods that minimize and/or eliminate those costs by shared platform shared by suppliers and consumers and using information consciously provided by consumers about their current needs from consumer queries. The shared platform can also provide information of consumer vouchers that were delivered and used. Thus, the shared platform can apply consumer conversion statistics across different suppliers.

Traditional systems often focus on informing potential consumers regarding an offer by offering a wide broadcasting of an offer to all consumers meeting certain criteria, limits, and/or known characteristics of the consumers, and/or the like. Such broadcasting methods and systems can generate a lot of undesired messages for a consumer, such as many alerts on a mobile device or many emails. Furthermore, such broadcasting methods and systems increase the usage of network bandwidth, especially if many sources are broadcasting messages to a large and wide audience. Moreover, messages are increasingly including enhanced content requiring the transmission of larger data files. In addition, broadcasting information often are not filtered on the supplier end and thus are not noticed immediately. Accordingly, this type of system puts the effort on the consumer to filter the messages and find the offers that meet the preferences and/or desires of the consumer. Furthermore, in this type of system, consumers have to check the validity of the date and/or store location. Broadcasting unfiltered messages creates information noise and often results in a situation where a consumer misses an interesting offer or the consumer's attention is detracted to a potentially irrelevant offer. It can also reduce the overall effectiveness of all targeting campaigns by numbing the effect of the voucher to the user. Moreover, traditional systems often extend vouchers for a long period of time, such as a few days or weeks. By broadcasting to distribute vouchers, suppliers cannot predict whether the consumer will notice them immediately. Such systems do not react to dynamic market changes and thus, cannot customize vouchers to custom tailor them to a smaller time window. Accordingly, supplier campaigns cannot therefore easily customize to specific geographical locations and/or narrow the voucher to a smaller time window.

Traditional systems currently available and used for finding offers and vouchers also fall short of dynamic voucher generation. Even though such systems provide categorized search of offers available in the web, they are based on web content analysis rather than based on information directly sourced or dynamically customized by suppliers. Thus, consumers often must verify the validity of found offers themselves and are able to find only publicly available offers not tailored for their unique consumer profile.

An additional limitation includes the complexity of identifying interesting and applicable offers at a particular time and/or a location, which can often discourage consumers from looking for them in the first place as the effort spent may not be worth the gain. This in turn limits the effectiveness of the targeting campaign as a whole. Consumers receiving a large number of offers become desensitized to offer content, treating the vouchers as spam. Another limitation is the overflow of multiple offers leading to overlooking an offer that the consumer would have otherwise use. Finding applicable offers that have already been expired and/or are too distant of a location can also further limit the reach of targeted marketing.

Another limitation to traditional systems is the inability to target specific consumers based on loyalty and/or a personal consumer profile. Existing loyalty programs provide appreciation to valued consumers, but suppliers cannot generate dedicated offers for each individual consumer. Instead, systems implement threshold-based groupings of consumers averaging offer benefits over particular groups that meet certain thresholds. This limits the generation of dynamic voucher generation custom tailored to individual consumers.

FIG. 1A illustrates an example of a traditional process for producing, targeting, and broadcasting digital or paper vouchers in a traditional targeting campaign. The process in this traditional targeting campaign can be very inefficient. For example, traditional systems can broadcast vouchers 140. On the consumer flow side 102, the vouchers can be blocked 104 (e.g., filtered as spam), overlooked 106 (e.g., due to information noise), ignored 108 (e.g., when consumers do not bother actively searching for the vouchers), overdue 110 (e.g., when vouchers are noticed too late such as when expired), misplaced 112 (e.g., when the location for voucher use is too far), and/or equalized 114 (e.g., same for a group of consumers and not custom tailored).

A part of the reason for this is due to the fact that on the supplier flow 112, the vouchers are created based on static information that is imprecise for both consumer targeting and analysis. Furthermore, the static information includes a lot of overhead and requiring human analysis. On the supplier flow, consumers are categorized based on potential consumers 124 (e.g., all consumers interested in the vouchers), known consumers 126 (e.g., supplier knows the consumer's email address), predicted consumers 128 (e.g., consumer current need predicted by the supplier), and addressed consumers 130 (e.g., selected needs addressed by vouchers). The addressed consumers 130 are a subset of the predicted consumers 128, the predicted consumers 128 are a subset of known consumers 126, and the known consumers 126 are a subset of the potential consumers 124. In traditional campaigns, only the addressed consumers 130 are the ones that supplier is able to target, which is small subset of all potential consumers 124.

Figure 1B:
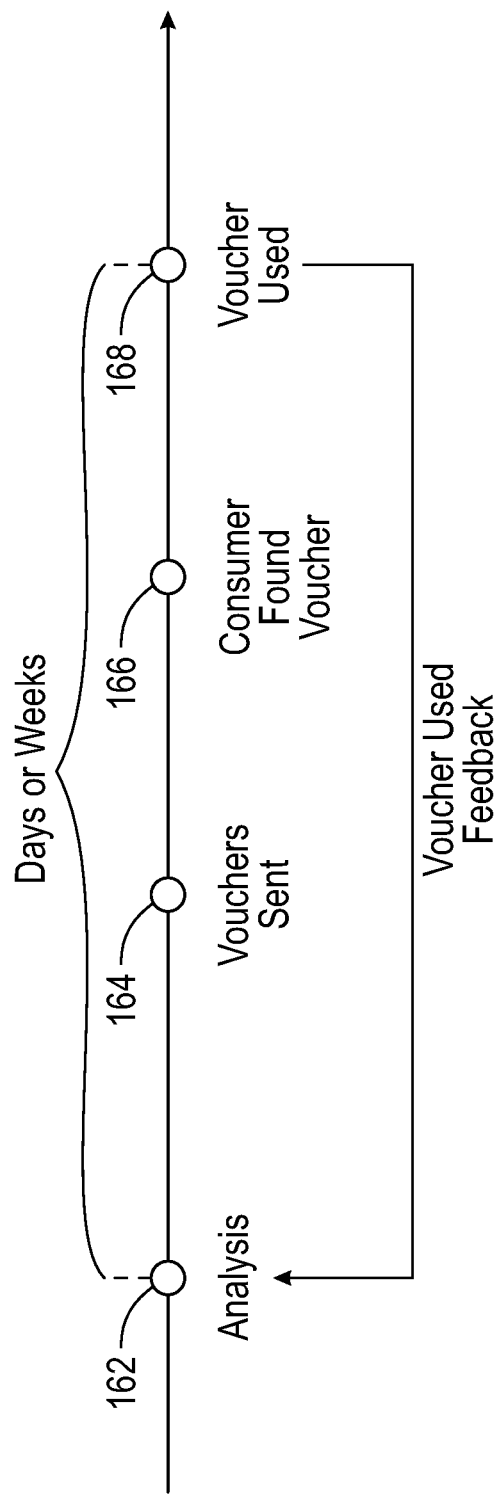
FIG. 1B illustrates a traditional approach to voucher generation over days or weeks.

FIG. 1B illustrates a traditional approach to voucher generation over days or weeks. Traditional systems can send the vouchers 164, the consumer can find the voucher 166, the voucher can be used 168, and feedback of whether the voucher is used can be analyzed 162 in order to determine future vouchers. As such, the feedback is generally limited to whether the voucher was used or not. It is not possible to determine specific consumer that used it and bind transaction to consumer profile. Furthermore, traditional systems generate vouchers that are valid for longer periods of time, such as days or weeks.

Systems and Methods for Dynamic Voucher Generation

Figure 2A:
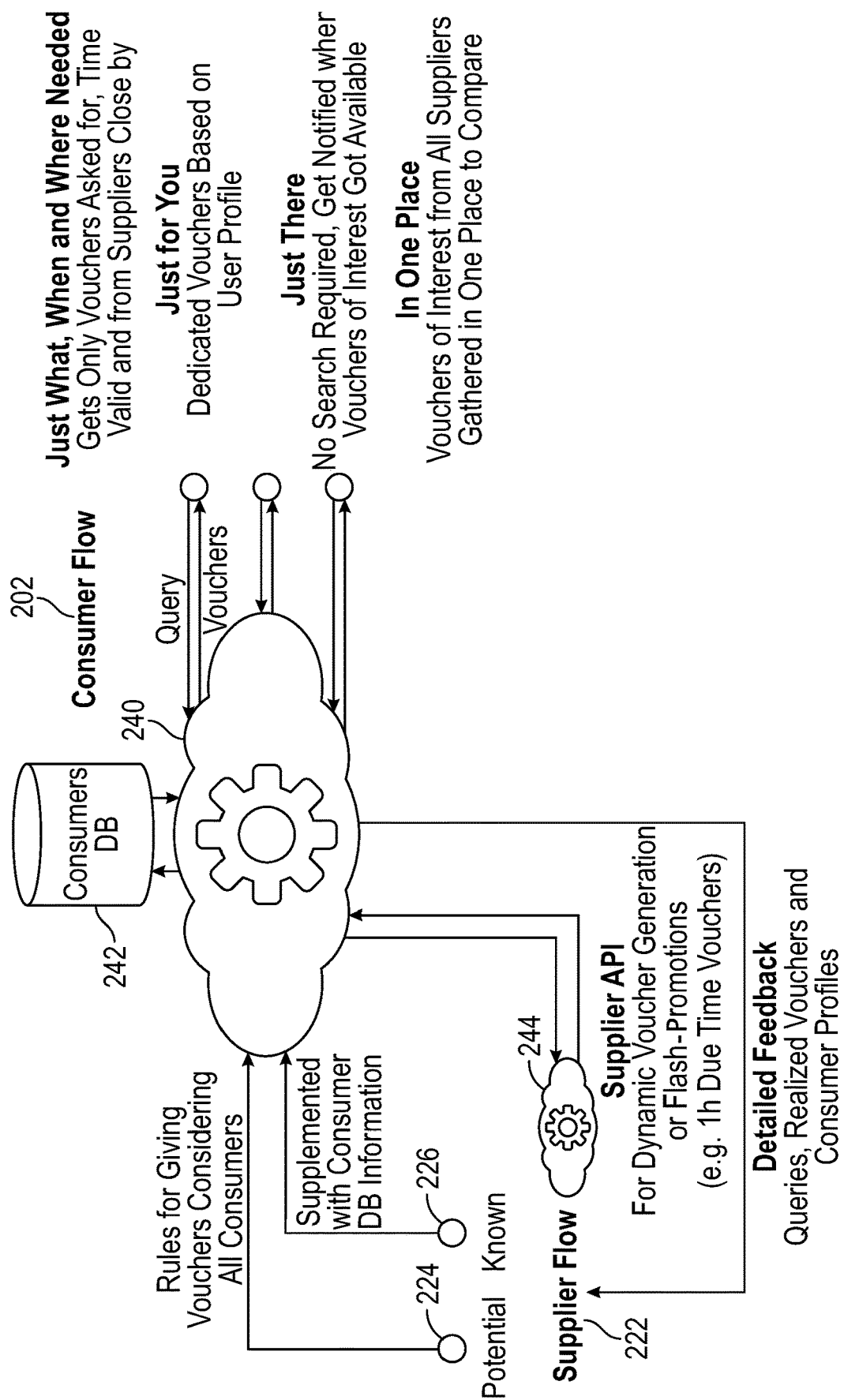
FIG. 2A illustrates an example of a dynamic voucher generation and distribution system according to some embodiments.

FIG. 2A illustrates an example of a dynamic voucher generation and distribution system according to some embodiments. Embodiments described herein provide a unified end-to-end system that is used by suppliers and consumers at same time. Consumers that are signed up in the dynamic voucher generation and distribution system can specify what kind of offers they are interested in and query the dynamic voucher generation and distribution system to search for matching offers. Suppliers instead of broadcasting predefined vouchers, can specify rules that describe how to generate a voucher based on consumer query.

In the consumer flow 202, consumer queries can include one or more of, but are not limited to:
  unique consumer ID
  time and date of the request
  geographic location and search radius or maximum drive distance/time
  list of categories and/or subcategories of products or services of interest
  list of specific products or services
  list of specific suppliers
  offer filters like minimum discount amount or discount percentage
  information about how query was triggered (manually, proximity based or periodic)

Additionally, consumer database(s) 242 can store detailed information about a consumer that can be obtained based on the unique consumer ID from the query and/or predicted by the dynamic voucher generation and distribution system. Examples include, but are not limited to:
  history of consumer queries
  history of realized vouchers with voucher information including time, locations, category, transaction price and savings achieved
  relation between consumer queries, corresponding voucher that was granted, same voucher realization, consumers to which the voucher was forwarded, consumer feedback provided after voucher realization
  each action can contain a time stamp and location
  list of verified loyalty program IDs associated with the consumer stored in the consumer profile
  calculated consumer global ranking based on consumer savings due to using vouchers and transaction price from used vouchers with rating contribution breakdowns or their combinations. Rankings can be based on:
    per category/subcategory
    per supplier including supplier's percentage contribution in all consumer transactions
    time and/or location distribution
  list of consumer group membership
  credit card information for "pay with the voucher" transactions In the supplier flow 222, the supplier can create sets of rules and conditions that can determine whether the voucher should be granted and calculate a customized amount of benefits based on query information above and/or consumer profile information from in database. For example, the supplier can identify rules for giving vouchers considering a plurality of potential consumers 224. Advantageously, the supplier can reach potential consumers in response to consumer queries, even the consumers that would not be known to the supplier otherwise. As described above, this technical advantage can be realized based on the practical application of combined database of vendors and consumers. Furthermore, consumers associated with loyalty and/or personal consumer profiles can be reached. Data from social media and web based digital campaigns can also be analyzed to generate the rules for giving vouchers. The supplier can supplement the analysis with consumer database information for known consumers 226. Additionally, voucher generator can include, but are not limited to:
  time and date
  list and supplier's premises locations fulfilling condition from consumer query The dynamic voucher generation and distribution system can provide each supplier a set of analysis data calculated based on consumer queries as well as based on granted and realized vouchers using the voucher generation and distribution system 240. Example of analysis output that can be provided include, but are not limited to:
  list, value and full information of the vouchers granted from the beginning of the campaign including list of consumers that get them
  list, value and full information of the vouchers realized from the beginning of the campaign including list of consumers that used them
  geographic, time and category distribution of queries, granted and realized vouchers as well as ratings and reviews
  distance and time between voucher granting and realization
  statistics for costs, ROI, campaign success rates
  customizable parameters calculated based on above In some embodiments, the analysis output data can be processed by the dynamic voucher generation and distribution system. The dynamic voucher generation and distribution system can determine a distribution of coupon status changes over time and/or geographical location. The dynamic voucher generation and distribution system can perform statistical analysis on changes based on promotions, by vendor, type of shopper, and/or the like to identify trends to generate models. The models can be applied to future queries to determine expected statistics, such as an expected conversion rate, which can be helpful for optimization of promotions. A heat map/graph can be displayed over a map showing where coupons were accepted, referred, and/or redeemed. A time distribution can show times between queries to acceptance, acceptance to redemption, queries to referrals, referrals to acceptances, acceptances to redemptions of referred coupons, and/or the like. Ratios of coupons can be generated such as accepted/redeemed based on promotions, the vendor, the shopper characteristic, and/or the like.

In some embodiments, the statistical outputs can be inputted to a webAPI for coupon benefit decisions done on the vendor server. Statistical outputs can be used as granting conditions for benefits. Examples of the granting conditions can include:

benefit of 75%—condition: user in top 10 loyal shoppers last month (most loyalty points gathered)

benefit of 50%—condition: user in top 10 referrers last month (referred most of the coupons that were at least accepted)

benefit of 25%—condition: none

The suppliers can distribute the dynamic vouchers via a supplier API 244. Voucher generator can be adapted automatically based on the data from campaign analysis data. For example, supplier can limit number of granted vouchers, adjust discount value based on current distance consumers were willing to travel, increase voucher benefits during weekdays with less number of queries, and/or the like.

Figure 2B:
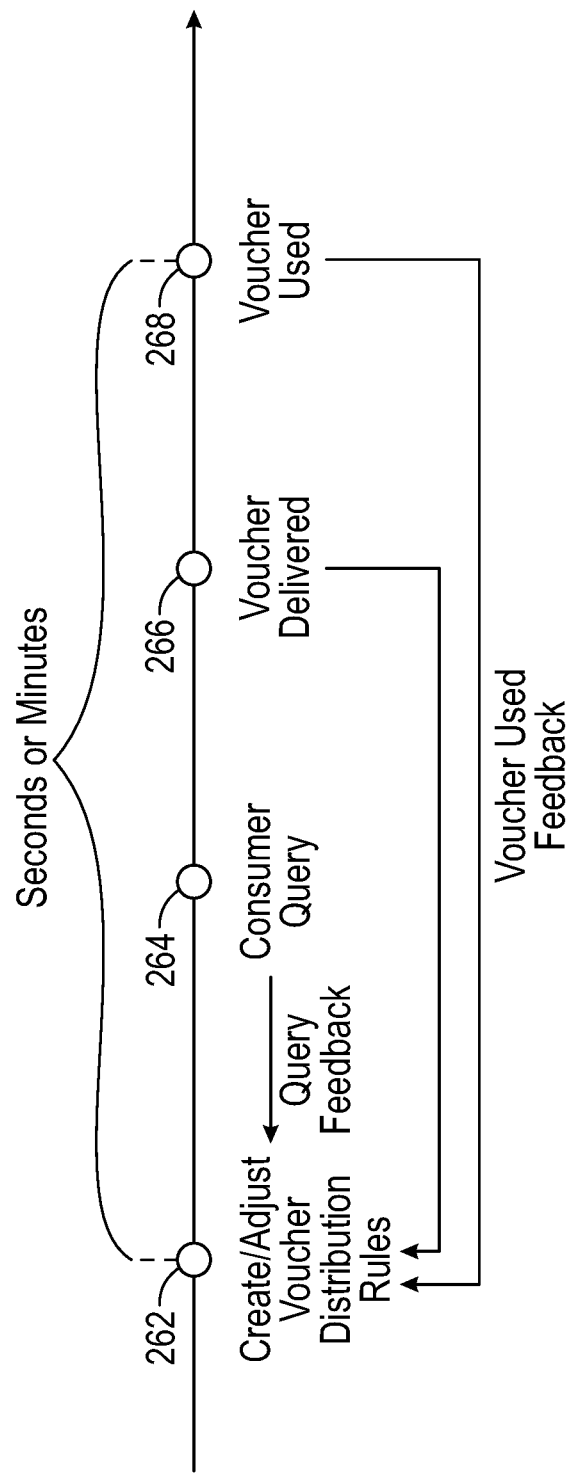
FIG. 2B illustrates voucher generation over a shorter time period according to some embodiments.

FIG. 2B illustrates voucher generation and lifetime cycle over a shorter time period such as, e.g., seconds or minutes, or in substantially in real time, according to some embodiments. The dynamic voucher generation and distribution system can receive a consumer query 264. The voucher can be generated and/or distributed 266, and the voucher can be used by the consumer 268. The dynamic voucher generation and distribution system can receive feedback as to whether the voucher was used and also receive feedback related to the consumer query 264. As such, the vouchers can be made to pertain to the immediate circumstances of the consumer, such as the consumer's current location and/or activity. This allows for a much faster reaction to market changes and enables the generation of dynamic vouchers and/or flash-promotions (e.g., vouchers that expire in one hour). For example, the dynamic voucher generation and distribution system can generate vouchers based on sale results in the last hour.

In some embodiments, a specific promotion with a short expiration date and benefits can be generated including granting conditions based on time or location, such as "time til promotion end" or "distance to query." In some embodiments, shopper location is tracked and such a promotion is sent based on a condition, such as a closeness in location.

In some embodiments, the coupon characteristic, such as the benefit, can be changed based on the location or the time of promotion expiration. For example, the closer a shopper is to a vendor site, the coupon's discount amount and/or percentage can be decreased.

In some embodiments, the coupons are created dynamically based on a consumer characteristic. For example, the mobile device of a user can be at a certain distance threshold from a content item provider. If the user profile matches rules (e.g. rules set by the content item provider), then the dynamic voucher generation and distribution system can dynamically generate a coupon for the consumer, even without a consumer query. If the user is driving within a 1 mile radius of a car wash and the profile indicates that the consumer washes his or her car every month, then the dynamic voucher generation and distribution system can dynamically provide a coupon for a carwash.

In some embodiments, the dynamic voucher generation and distribution system can dynamically create reminders. The dynamic voucher generation and distribution system can create reminders based on a coupon characteristic, such as when the coupons are close to expiring (e.g. send higher discounted coupons to ensure all seat tickets are sold for an event). The dynamic voucher generation and distribution system can create reminders based on user characteristics, such as a user preference or location (e.g. coupon reminder when the consumer is very close to a location of a supplier). The dynamic voucher generation and distribution system can create reminders based on other characteristics, such as a time of day, a day of the week, the current weather, and/or the like (e.g. lunch coupon when the consumer is close to a particular restaurant). The dynamic voucher generation and distribution system can create reminders based on supplier characteristics, such as a conversion rate of the consumer with the supplier for a coupon (e.g. send a reminder when the consumer has visited the supplier frequently over the past few months).

In some embodiments, the shoppers have the option to add vendors as their favorites. Vendors can then reach out with their coupons. Vendors can in return provide them with special offers during their query, providing them with additional bonuses for adding them to their favorite lists.

Figure 3:
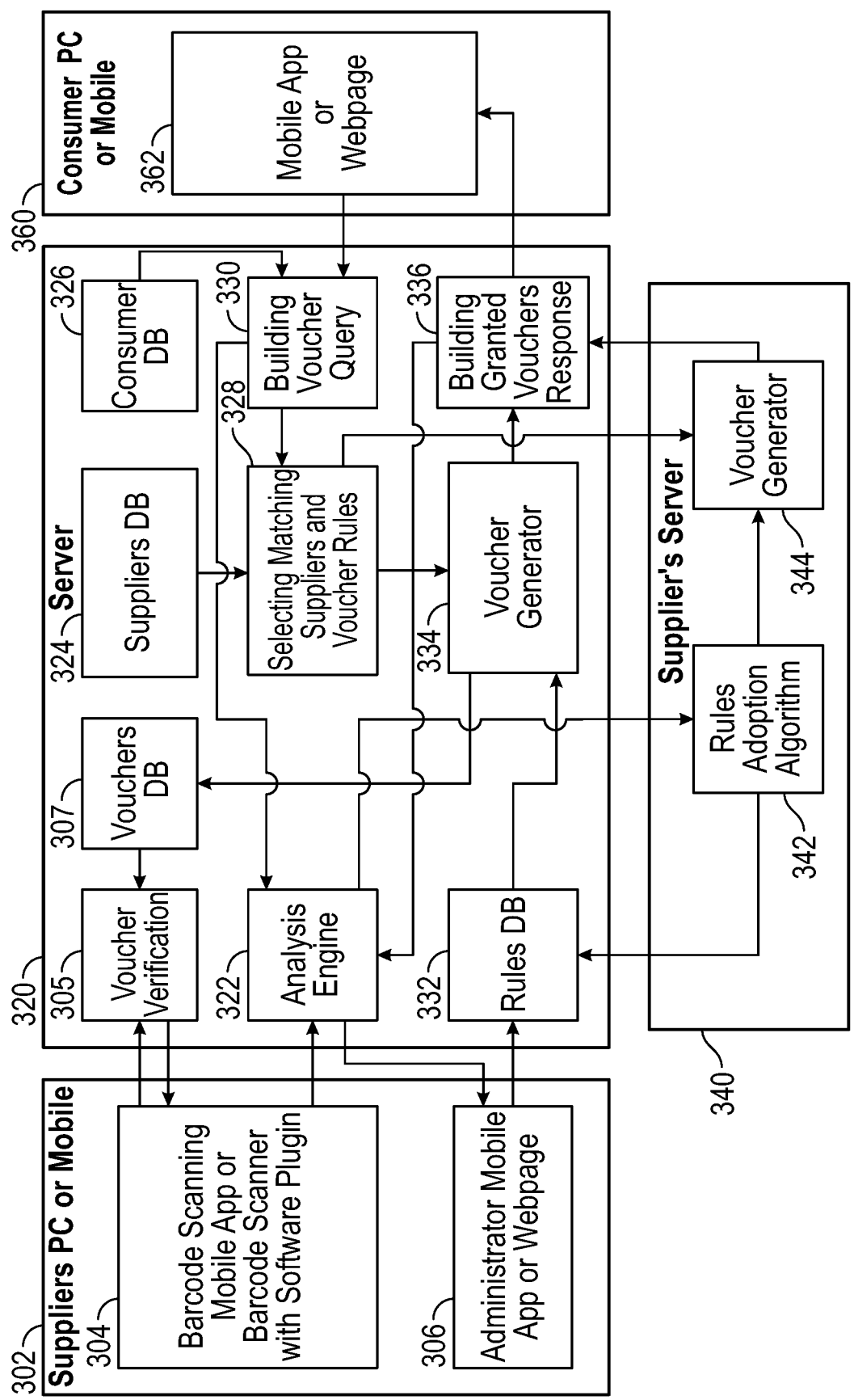
FIG. 3 illustrates an example dynamic voucher generation and distribution diagram with information flow according to some embodiments.

Dynamic Voucher Generation and Distribution Concept Diagram with Information Flow FIG. 3 illustrates an example dynamic voucher generation and distribution diagram with information flow according to some embodiments. In some embodiments, the supplier's personal computer or mobile device 302 can provide a barcode scanning mobile application or barcode scanner with software plugin 304. The supplier's personal computer or mobile device 302 can include an administrator mobile application or web page.

In some embodiments, the dynamic voucher generation and distribution system can include a dynamic voucher generation and distribution server 302. The supplier's personal computer or mobile device 302 interface with the dynamic computer generation and distribution server 320. The dynamic computer generation and distribution server 320 can include an analysis engine 322 that receives realized vouchers and purchase transaction information from the supplier's personal computer or mobile device 302. The analysis engine 304 can also receive input from the building voucher query 330 that receives information on the consumer query and/or the building granted vouchers response 336 that determines the vouchers granted to the consumer. The analysis engine 322 can send the targeting campaign analysis information to the administration mobile application or webpage 306.

In some embodiments, the voucher generator 334 can generate vouchers based on consumer queries and store in vouchers database 307. When supplier scan granted with voucher barcode scanning mobile application or barcode scanner with software plugin 304, voucher information can be sent to voucher verification 305 for verification. Verification result can be sent from voucher verification 305 to barcode scanning mobile application or barcode scanner with software plugin 304 providing information of voucher validity. Barcode scanning mobile application or barcode scanner with software plugin 304 can send to analysis engine 322 information about voucher realization and purchase transaction details.

The dynamic voucher generation and distribution system can provide a downloadable electronic file for the vendor device that enables processing of a QR code provided by a shopper. The shopper can present the QR code to the vendor point of sale device, such as a mobile device or a tablet. The vendor device can scan the QR code and request the dynamic voucher generation and distribution system for verification of the coupon. The vendor can apply the discount from the vendor's point of sale and confirm that the coupon was redeemed with the dynamic voucher generation and distribution system. The electronic file can be an extension plugin for a vendor counter software such that the dynamic voucher generation and distribution system QR codes can be scanned using the vendor's counter scanner directly.

The downloadable electronic file for the vendor can allow for direct payment using the QR code. The dynamic voucher generation and distribution system can retrieve financial information of the consumer, such as a consumer's credit card, and the credit card information can be sent to the vendor without the vendor having access to that information. Advantageously, the technical problem of personal information security in today's digital age is improved by the practical application of sending the credit card information directly with the vendor device, and without the vendor being able to see the credit card information. Digital identify theft has become an increasing technical issue with credit card scanning technology being able to steal credit card information. However with this system, the dynamic voucher generation and distribution system can automatically facilitate the transaction without the use of a credit card scanner at the point of sale system for the vendor.

The downloadable electronic file can allow for direct payment automatically, reducing the number of graphical user interfaces needed for a typical payment purchase. In traditional payment procedures, a credit card is swiped on a vendor point of sale system, the system verifies the credit card with the bank, an employee of the vendor confirms the verification, the point of sale system displays the amount, the user verifies the amount and signs the point of sale system to complete the transaction. However, the downloadable electronic file can communicate with a dynamic voucher generation and distribution system, where the dynamic voucher generation and distribution system has already verified the credit card information of the user. Advantageously, the downloadable electronic file provides a technical solution to a technical problem by automatically receiving verification of the credit card and completing the transaction with a simple click of the user verifying the transaction. For example, if the vendor begins a transaction with the user, the vendor system can automatically notify the dynamic voucher generation and distribution system, the dynamic voucher generation and distribution system can automatically send an alert to the user device, the user device can select a button to accept the transaction, the user device can automatically transmit the selection to the dynamic voucher generation and distribution system, and the dynamic voucher generation and distribution system can automatically send the credit card information to the vendor device to complete the transaction. Thus, the technical problem of navigating through numerous graphical user interfaces to complete a payment purchase is solved by the practical application of automatically receiving verification of a credit card and completing a transaction.

In some embodiments, the analysis engine 322 can send the analysis of the targeting campaign to a supplier server 340 that includes a rules adoption algorithm 342 and/or a voucher generator block 344. The rules adoption algorithm 342 can send the voucher generation rules to a rules database 332. The rules database 332 can also be directly updated from supplier's personal computer and/or mobile device 302 via the administrator mobile application or webpage 306.

In some embodiments, the rules database 332 can be accessed by voucher generator module 334. The voucher generator module 334 can generate vouchers based on the received rules, supplier's information from suppliers database 324 and/or consumer's voucher query built by building voucher query module 330. The voucher can then be transmitted to the building granted vouchers response block 336, which transmits the vouchers to a mobile application and/or webpage 362 of a consumer personal computer and/or mobile device 360. In some embodiments, the vouchers can be displayed on a user device 360 without the downloadable file and/or corresponding application being launched. The user can receive such vouchers as a notification, such as a text message or a pop-up, while the application is in an unlaunched state. The user can then select the notification to launch the application, improving display interface technology by allowing a user to more quickly access voucher-related information stored in the application and/or a corresponding database. Such a notification with an unlaunched application improves the technical problem of the user having to open the application and navigate across several interfaces of the application to identify related vouchers.

In some embodiments, the mobile application and/or webpage 362 of a consumer personal computer and/or mobile device 360 can transmit a query from a consumer to a building voucher query 330 that receives query information and consumer information from a consumer database 326. The dynamic computer generation and distribution server 320 can include a selecting matching supplier and voucher rules block 328 that receives query information from the building voucher query block 330 and/or supplier information from a supplier's database 324. The selecting matching suppliers and vouchers rules 328 can transmit the matching information to the voucher generator 334 to generate custom rules and/or vouchers for the selected consumer.

Supplier Web API Extension

In some embodiments, suppliers can use an algorithm running on their own server in order to calculate voucher discount and/or change voucher granting rules. Supplier's server system can connect to the dynamic voucher generation and distribution system using predefined web APIs. Suppliers can configure their system to route consumer queries fulfilling specific conditions via web API to their servers, where voucher to be granted will be calculated. The voucher data can be routed back to the dynamic voucher generation and distribution system and send as a response to the consumer query.

In some embodiments, suppliers can specify conditions using campaign analysis, which can trigger web API requests to supplier servers that would recalculate and update set of vouchers granting rules. In some embodiments, suppliers can add and/or modify rules via the API. The suppliers can automate the rules process based on triggers from the dynamic voucher generation and distribution system. The triggers can be generated based on analysis of parameter thresholds that can be set up before the suppliers connect to the dynamic voucher generation and distribution system.

In some embodiments, with web API extensions, suppliers can have more flexibility in defining their rules for vouchers as well as use their databases containing consumer information to supplement the system capabilities and further enhance their campaigns. Web API extensions enable suppliers to implement own proprietary and most sophisticated algorithms on their servers that would be requiring lots of compute power. For example, suppliers can use their own loyalty program database to grant better valued vouchers to loyal consumers. These consumers can be identified using loyalty number forwarded on the API.

Suppliers and Product Reviews

In some embodiments, upon verified realization of the voucher, consumers can be requested for feedback about the supplier. Optionally consumer can also write a review or/and fill out questionnaire. As reviews will be provided only by consumers who really used the voucher and transaction is verified by supplier, it would be very difficult to provide false reviews.

In some embodiments, in case the voucher is product specific, consumers can be requested to review specific product in similar way as for supplier rating. Again, only consumers who used voucher to purchase product can be able to provide feedback.

In some embodiments, each review can be rated by other consumers as helpful. Consumer review that gathered multiple ratings as helpful would positively impact consumers rating. For this reason the consumer feedback is encouraged.

Consumer Social Network

Social media and web based digital campaigns are becoming an effective and cost-effective method to reach potential and current consumers. The digital campaigns also enable automated analysis of feedback and much faster reaction time to changes on the market. Automated, algorithm-based systems can dynamically customize offers to consumers, automatically target each consumer separately customizing the offer based on time (e.g., time between vouchers, time of the day, time since similar service and/or good purchased, and/or the like), location (e.g., distance from a merchant, conversion rates for certain distances from a location, a determination of a consumer's means of transportation, and/or the like), and/or consumer profile (e.g., a consumer's preferences to goods and/or services, user habits, what was queried at a certain location or time, a predefined shopping cart of desired goods and/or services, a search query, what and where they referred, accepted, queried, redeemed, and/or reviewed coupons, and/or the like) to deliver dedicated offers providing a powerful tool for modern day marketing.

In some embodiments, consumers signed up in the system can reach out to each other and add other consumers to list of friends. Added a consumer can confirm being a friend with the one that initiated it. Consumers can invite new users via email or social media. Such invitations may contain forwarded voucher data to encourage new users to join.

In some embodiments, the shopper and vendors can both be a part of the same social network. An open, shared/common, public network can be used by vendors as their customer database. A user of the network can invite a friend to the network and/or connect one friend to another. The connections can include certain actions, such as a shopper referring coupons to friends only, or vendors broadcasting coupons to shopper-friends only. The vendors can get indirect access to all shoppers, such as friends of friends.

Consumer Public Groups

In some embodiments, each consumer can create publicly visible and/or private groups. Groups can be ranked based on its members rating and can be targeted by suppliers for special offers.

In some embodiments, suppliers can create consumer groups. Consumer group voucher grant can be controlled by predefined rules (e.g., group ranking) as well as from web API. Suppliers can create several groups to which vouchers with different level of benefits can be delivered.

Registering Products

System may be configured to create special accounts for Producers. Producers can register their products in database under unique ID. The ID would be generated and assigned by the system. Alternatively, product can be registered using UPC (Universal Product Code) it is registered with. Along with ID each product need to be provided with a brand, name and to be associated with specific category. For each category additional information might be entered. Product description, ingredients, technical parameters, usage instructions, dietary information and any other information normally found on product labels or package can be entered and associated with registered product. System will provide ready to fill up forms with most common parameters of products belonging to specific category. For example: screen size, power consumption, refresh rate or 3d support for products from TV category.

Registered products database would be available for all parties using the system. Consumers can search for registered products to query for any vouchers or discounts associated with them or categories they belong to. Producers and Suppliers can use the products from database to create rules for vouchers generation.

Producers can print product unique ID on its package or mark the product with its unique ID using other technology. In case of products registered under UPC code the existing barcode or marking can be reused. Otherwise new unique ID assigned by system during registration in form of a barcode, QR-code, NFC or any other technology for in-store product identification can be printed or placed on the product or its package.

Consumers are able to scan product unique ID using application to use it in a query for vouchers, discounts or special offers. Offers for specific product or for category or subcategory it belongs to will be returned. As such, consumers may receive or gather discounts (e.g., instantaneously) while in the store.

Consumers can also use scanned product's unique ID to check information Producer placed in the system. Consumers can create set of filters for products parameters to verify if product is fulfilling their needs. For example, Consumers can create allergens filter for grocery products in order to be notified in case scanned product contain any of them on its ingredients list.

Products information can also be used in consumer queries. For example, consumer can query for vouchers for TVs with specific feature and screen size.

Consumers that realized vouchers for specific products will be requested for a rating and/or review of the product. This way reviews would come only from Consumers that purchased the product.

Suppliers can also register their services in similar way. For example, restaurant can register specific dish under unique product ID and use it in form of QR-code in their menu. Consumers can get information about its ingredients, verify allergens, check if it fulfills their diet constrains, see picture of the dish or to query for a discount. Each user account in the system can be a consumer, supplier and producer at the same time.

Blockchain

In some embodiments, granting and realizing vouchers can include a transaction between specific Supplier and Consumer. Both parties, transaction details, rules and conditions of granting as well as realization of voucher and feedback to system can be connected and recorded. Both parties can be able to verify the transaction validity and to make sure voucher is unique. Blockchain technology can be used to manage and validate voucher transactions.

Figure 4A:
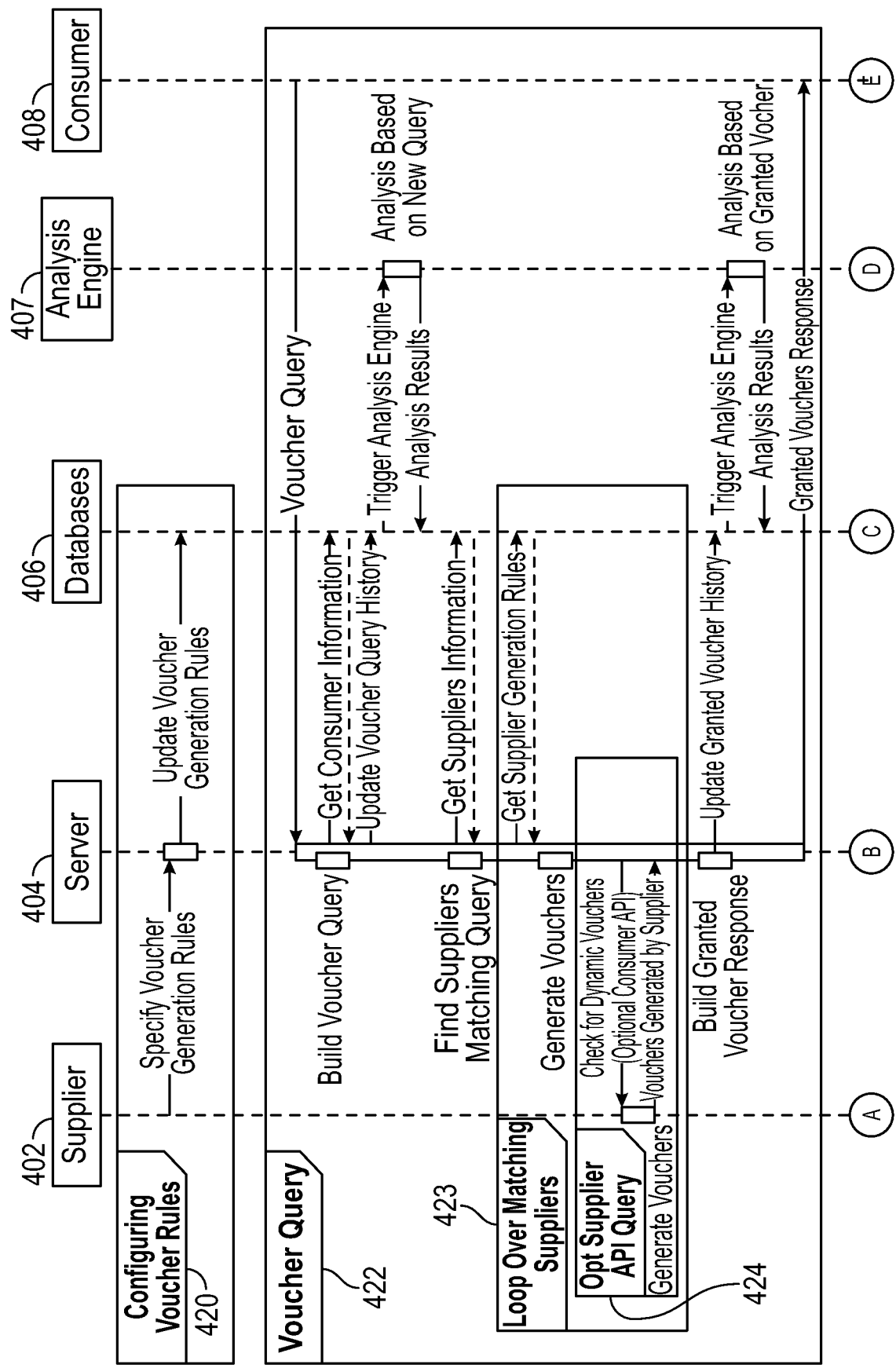
FIGS. 4A and 4B illustrate examples of flow diagrams for dynamic voucher generation and distribution system according to some embodiments.
Figure 4B:
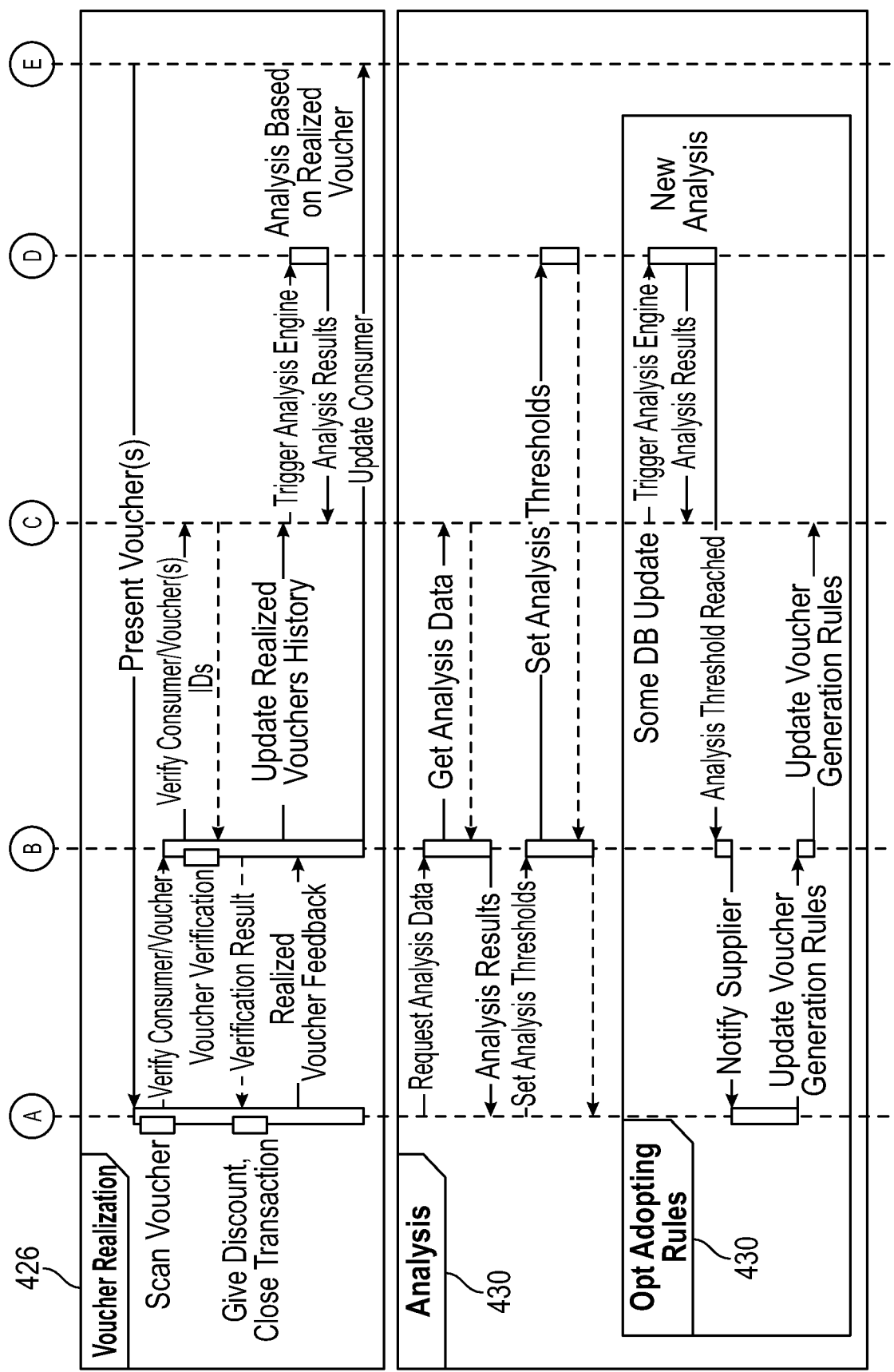

Example System Flow Diagram for Dynamic Voucher Generation and Distribution System FIGS. 4A and 4B illustrate examples of flow diagrams for dynamic voucher generation and distribution system according to some embodiments. In some embodiments, the supplier 402, the server for the dynamic voucher generation and distribution system 404, the database for the dynamic voucher generation and distribution system 406, the analysis engine 407, and/or the consumer 408 transmit data to generate and/or distribute the dynamic voucher.

In some embodiments, the dynamic voucher generation and distribution system can configure voucher rules 420. The supplier 402 can set voucher generator and send the rules to the server 404. The server can send the rules to a rules database 406 to update the database 406.

In some embodiments, the dynamic voucher generation and distribution system can facilitate voucher queries 422. The consumer 408 can send a query for a voucher to the server 404 of the dynamic voucher generation and distribution system. The server can update the voucher query history with the database 406. The database 406 can trigger the analysis engine to analyze the query and send the analysis results back to the database 406. The servers 404 can then find the suppliers matching the query based on information from the database.

In some embodiments, the server can request and receive supplier generation rules from the database 407 in block 423.

The server 404 can retrieve consumer information from the database 406 and generate vouchers based on the consumer information and/or the query information. The server 404 can grant the vouchers to the consumer 408 and update the database 406 of the granted voucher. Updating the database 406 can initiate the analysis engine 408 to analyze the granted voucher and send the results back to the database 406. The server 404 can then grant a vouchers response to the consumer 408.

In some embodiments, the server of the dynamic voucher generation and distribution system can communicate with the supplier 402 via a supplier API at block 424. For example, the supplier can initiate a call for information. The server 404 of the dynamic voucher generation and distribution system can check for dynamic vouchers from the supplier.

In some embodiments, the dynamic voucher generation and distribution system can track voucher realization at block 426. The consumer 408 can present a voucher to the supplier 402. The supplier 402 can scan the voucher (e.g., via a barcode) and ask for verification of the consumer and/or voucher. The consumer and/or voucher IDs requested for verification can be checked against information from the database 406 and/or the verification results can be sent back to the supplier 402. The server of the dynamic voucher generation and distribution system can provide a discount and/or close a transaction for a supplier 402. The supplier 402 can realize the voucher, and the dynamic voucher generation and distribution system can notify the server 404 that the voucher was realized. The database 406 can be updated with the realized voucher information. Updating the database 406 can trigger the analysis engine 407 to analyze the realized voucher and send the analyzed results back to the database. Then, the server 404 can update the consumer 408 about successful voucher realization.

In some embodiments, the server of the dynamic voucher generation and distribution system gather targeting campaign analysis data. In some embodiments, the supplier 402 can request analysis data from a server 404 of the dynamic voucher generation and distribution system. The server 404 of the dynamic voucher generation and distribution system can request information from the database 406. The database 406 can return data that the server of the dynamic voucher generation and distribution system 404 can provide to supplier 402 as a result. The supplier 402 can set analysis thresholds for the analysis engine 407. When new analysis results are available, analysis engine can issue analysis trigger notification to server 404 in case analysis thresholds are reached. Notification about reaching predefined thresholds is then forwarded from server 404 to supplier 402. Supplier can use analysis threshold notifications to trigger own algorithms calculating modifications of voucher generation rules and send them as an update to the server 404, which in turn update them in database 406.

Example System Flow Diagram for Shopper Query for Coupons

FIGS. 5A-5D illustrate examples of flow diagrams for shopper query for coupons according to some embodiments. In some embodiments, the dynamic voucher generation and distribution system can include a server 504 that can communicate with a shopper 502, a database 506, and/or a vendor 508 in order to respond to a shopper query for coupons. The dynamic voucher generation and distribution system can include a database 506 that includes one or more databases, such as the databases described in FIG. 7. The dynamic voucher generation and distribution system can include an electronic file installed on the shopper system 502 (e.g. a mobile application for the consumer device). The dynamic voucher generation and distribution system can include an electronic file installed on the vendor system 508 (e.g. an electronic application for the vendor point of sale device).

Figure 5A:
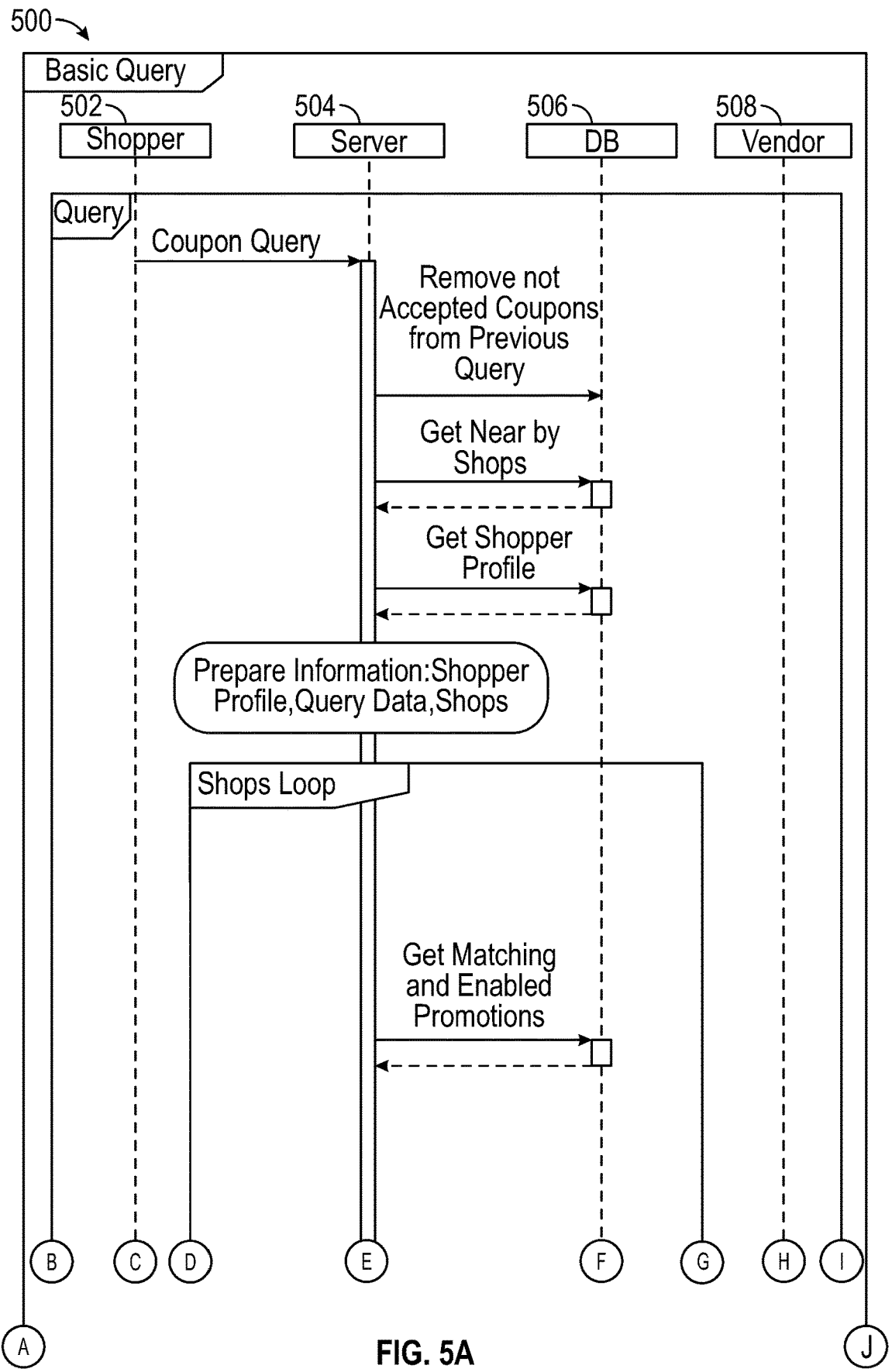
FIG. 5A illustrates an example of a query and query response according to some embodiments.
Figure 5A:
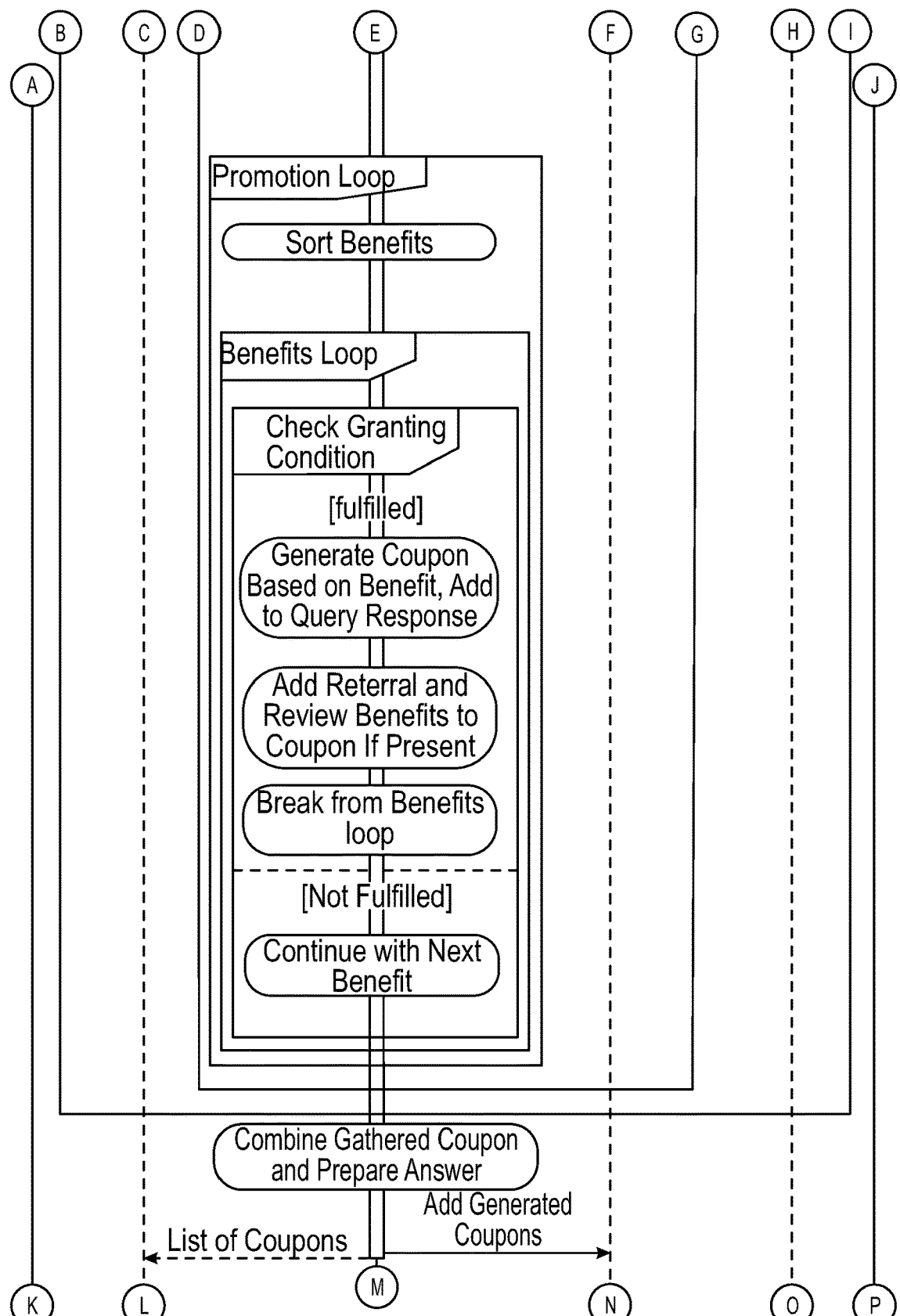

FIG. 5A illustrates an example 500 of a query and query response according to some embodiments. In some embodiments, the shopper 502 can send a coupon query to the server 504. The coupon query can include a specific query request. The coupon request can include a desired category, such as car wash. The coupon query can include location information, a time frame (e.g. currently open coupon), a certain benefit (e.g. over 50% discounts), and/or the like.

In some embodiments, the server 504 can identify coupons that were previously not accepted by the shopper 502. Then the server 504 can indicate to the database 506 to remove not accepted coupons from previous queries. Advantageously, more relevant coupons can be provided to the user.

In some embodiments, the server 504 can request nearby shop information from the database 506, and the database 506 can transmit the nearby shop data (e.g. content provider data) back to the server 504. For example, the server 504 can request shops within a certain threshold radius of the geo-location of the shopper 502. The server 504 can request a shopper profile for the shopper 502 from the database 506, and the database 506 can transmit the shopper profile back to the server 504.

In some embodiments, the server 504 begins a shops loops where the server 504 requests matching and enabled promotions from the database 506. The server 504 can request matching rules of the vendors 508 that provide the coupons and apply the matching rules to the retrieved shopper profile. Then, the server 504 can identify coupons that meet the matching rules of the vendor. For example, the vendor 508 may only want customers that wash their car at least once a month, or a customer with an income over $50,000. The server 504 can identify whether the shopper meets this criteria and pull the corresponding coupons for the shopper. The server 504 can also identify whether a promotion is enabled, such as not yet expired.

In some embodiments, the server 504 begins a promotion loop. The server 504 sorts the benefits of the coupons, begins a benefits loop, and checks on whether the granting condition has been met. For example, the benefits can be sorted based on a discount amount, a discount type, a granting condition, and/or the like. During the shopper query, the granting conditions of the benefits are checked starting with the benefit of the highest discount amount to the benefits with lower discount amounts. An example of a granting condition includes a query based granting condition, such as a shopper's distance to a vendor, a category searched, a desired benefit type, and/or the like. Another example of a granting condition is based on a shopper profile, such as a number of loyalty points within a time period, history of shopper queries, time of last visit and/or transaction, whether coupons were queried, referred, realized, and/or the like. A third example of a granting condition includes statistics, such as current promotion statistics, sales benefits, ROI targets, a number of remaining coupons (e.g. remaining seats to a show), where in some embodiments, data can be collected from the vendor 508.

In some embodiments, the server 504 can generate a list of coupons for each matching promotion based on the benefit and add the coupon to the query response.

In some embodiments, the server 504 can add referral and review benefits to the coupon if present. For example, if the shopper 502 was matched to the coupon by another consumer and/or if the shopper 502 left a review for the corresponding vendor 508, the server 504 can add additional benefits to the matched coupon. Then, the server 504 can break from the benefits loop and continue with the next benefit.

In some embodiments, after the coupons have been assessed, the server 504 can combine the gathered coupons and prepare an answer in the form of a query response. The server 504 can send the generated coupons to the database 506 to store the coupons that were sent to the shopper 502, and the server 504 can send the generated coupons to the shopper 502 in the form of a query response.

Figure 5B:
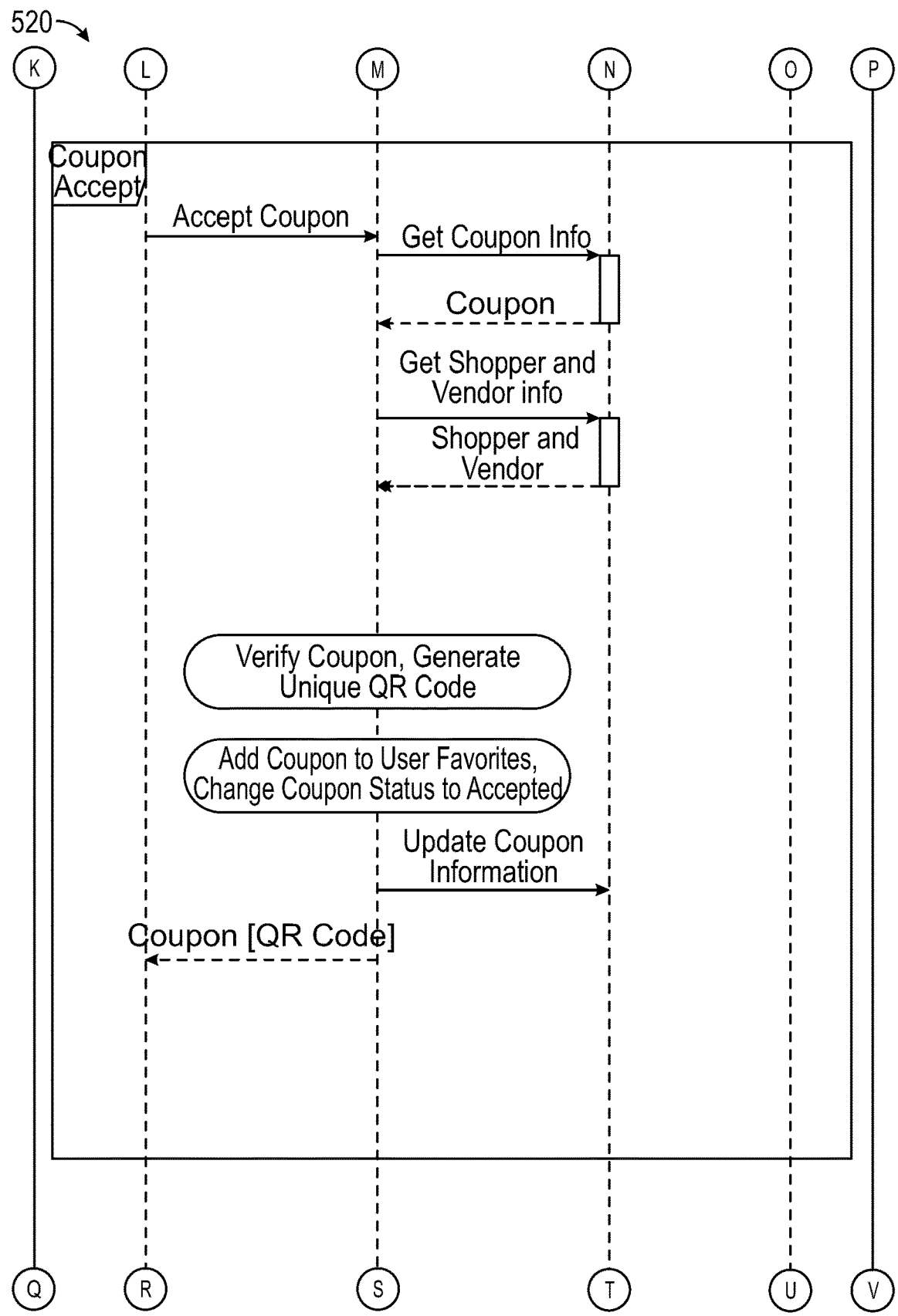
FIG. 5B illustrates an example of a QR code generation for the coupon according to some embodiments.

FIG. 5B illustrates an example 520 of a QR code generation for the coupon according to some embodiments. In some embodiments, the shopper 502 can indicate to the server 504 of accepting a coupon of interest. The server 504 can request and receive coupon information from the database 506. The server 504 can then verify the coupon, and generate a unique QR code for the coupon. In some embodiments, the server 504 can add the QR code to the shopper favorites and/or change the coupon status to accepted or transmitted.

In some embodiments, the server 504 can send an update to the database 506, such as the corresponding QR code. The server 504 can send the QR code corresponding to the coupon to the shopper 502.

Figure 5C:
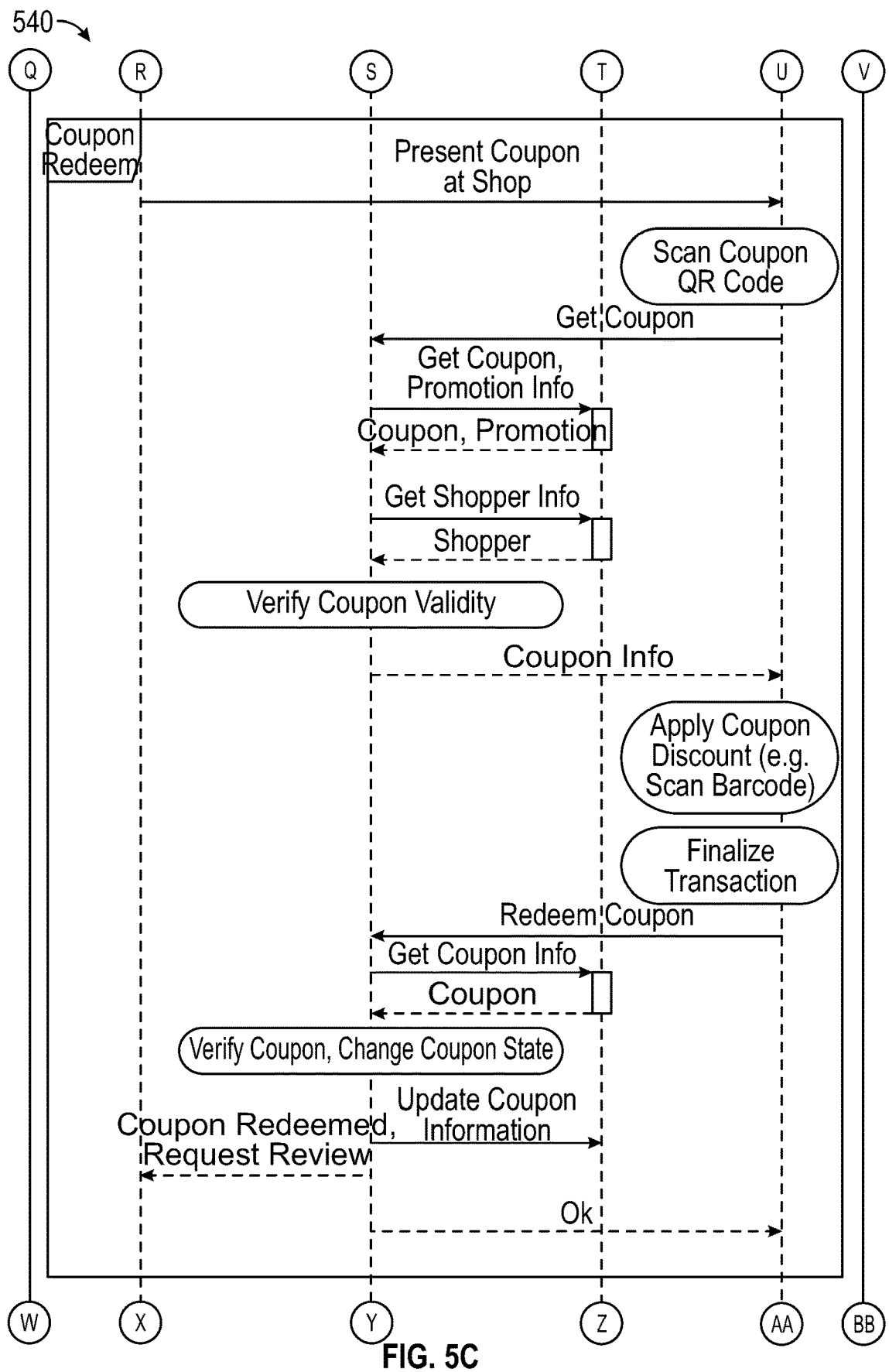
FIG. 5C illustrates an example of redeeming a coupon using the QR code according to some embodiments.

FIG. 5C illustrates an example 540 of redeeming a coupon using the QR code according to some embodiments. In some embodiments, the shopper 502 can present the QE code directly to the vendor 508. The vendor 508 can scan the QR code from the shopper 502 computing device. Then, the vendor 508 can request to retrieve the coupon from the server 504.

In some embodiments, the server 504 can request and receive the coupon and promotional information from the database 506. The server 504 can request and receive corresponding shopper information from the database 506. The server can verify the coupon validity, such as verifying that the coupon corresponds to the promotion, benefit, shopper, vendor, and/or the like.

In some embodiments, the server 504 transmits the coupon information to the vendor 508 after verification, and the vendor 508 applies the coupon discount (e.g. by scanning the barcode) and finalizes the transaction with the shopper 502. The vendor can indicate that the coupon was redeemed to the sever 504. The server 504 can request and receive the coupon information from the database 506, can verify the coupon and change the state of the coupon as redeemed, and send the updated coupon information back to the database 506. Moreover, the server 504 can send a confirmation that the coupon was redeemed to the shopper 502 and to the vendor 508.

Figure 5D:
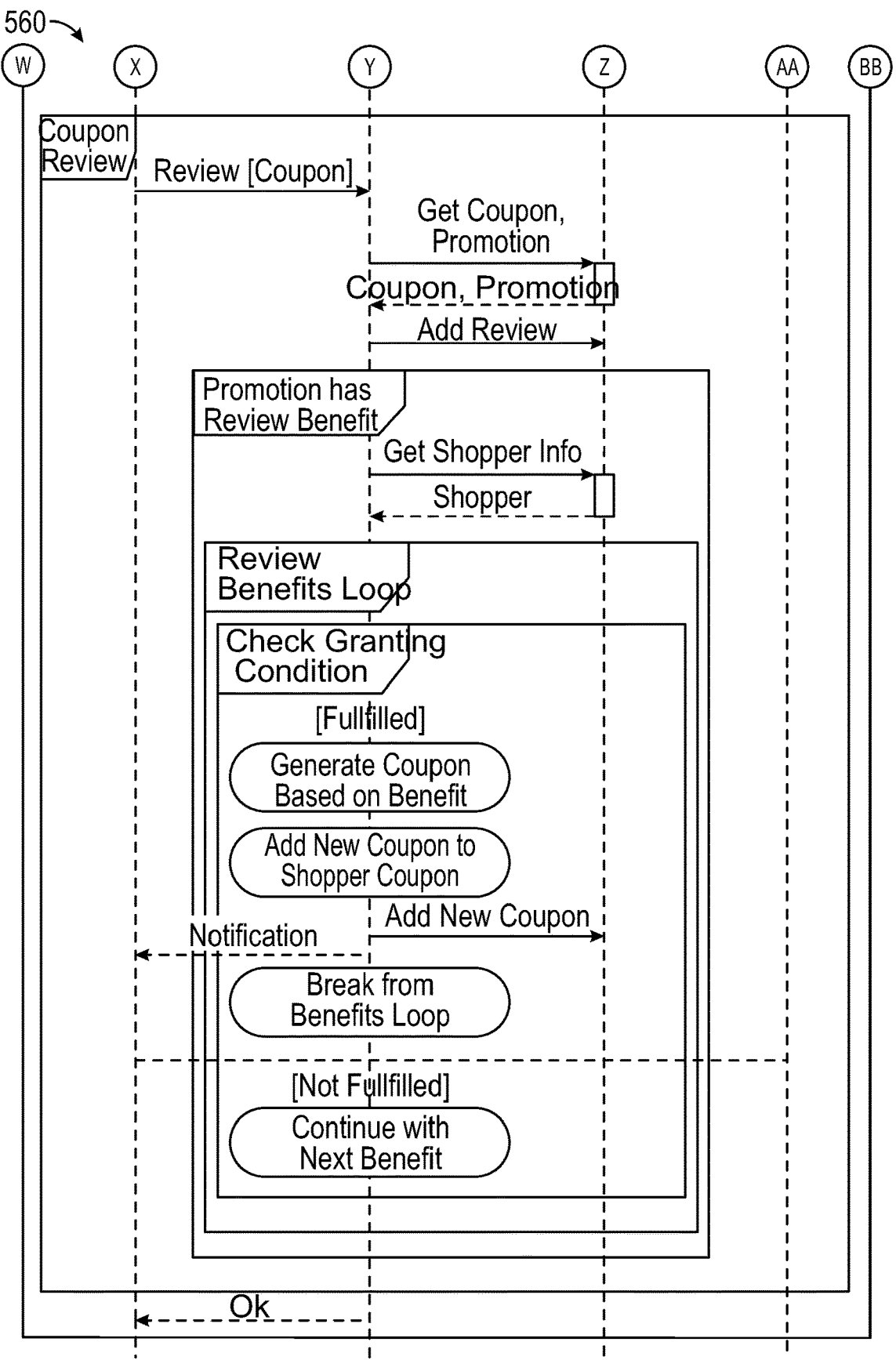
FIG. 5D illustrates an example of leaving a review for the vendor according to some embodiments.

FIG. 5D illustrates an example 560 of leaving a review for the vendor according to some embodiments. In some embodiments, the shopper 502 can leave a coupon for the vendor 508 by sending the review to the server 504. The server 504 can request and receive the coupon and the promotion from the database 506. The server 504 can then determine whether the review includes a promotion in the promotion has review benefit loop.

In some embodiments, the server 504 requests and receives shopper information from the database 506. The server 504 can begin the review benefits loop and check the grant condition for the review. If the condition is met, the server 504 can generate the coupon based on the benefit and add a new coupon to the shopper coupons. The server 504 can then send the new coupon to the database 506, and a notification can be sent to the shopper 502 indicating the new available coupon. The server 504 can break from the benefits loop and continue with the next benefit. If the granting condition was not met, the benefits loop can also be broken and the server 504 can continue to the next benefit. Once all benefits have been verified, the shopper 502 can be notified by the server 504 of its additional promotions based on the review.

Example System Flow Diagram for Shopper Referral for Coupons

In some embodiments, granted vouchers can be forwarded to other consumers from the friends list. Suppliers might specify which vouchers can be forwarded to others. Suppliers also determine whether to forward the voucher and/or determine whether the consumer passed on the voucher.

In some embodiments, forwarded voucher benefits can be recalculated based on recipient profile and/or might differ from the original ones. Suppliers can specify rules for forwarded voucher's benefit calculation. Supplier can specify rules to generate special referral vouchers as a benefit for the forwarding consumer. Referral vouchers can be granted once the forwarded voucher is realized.

Figure 6A:
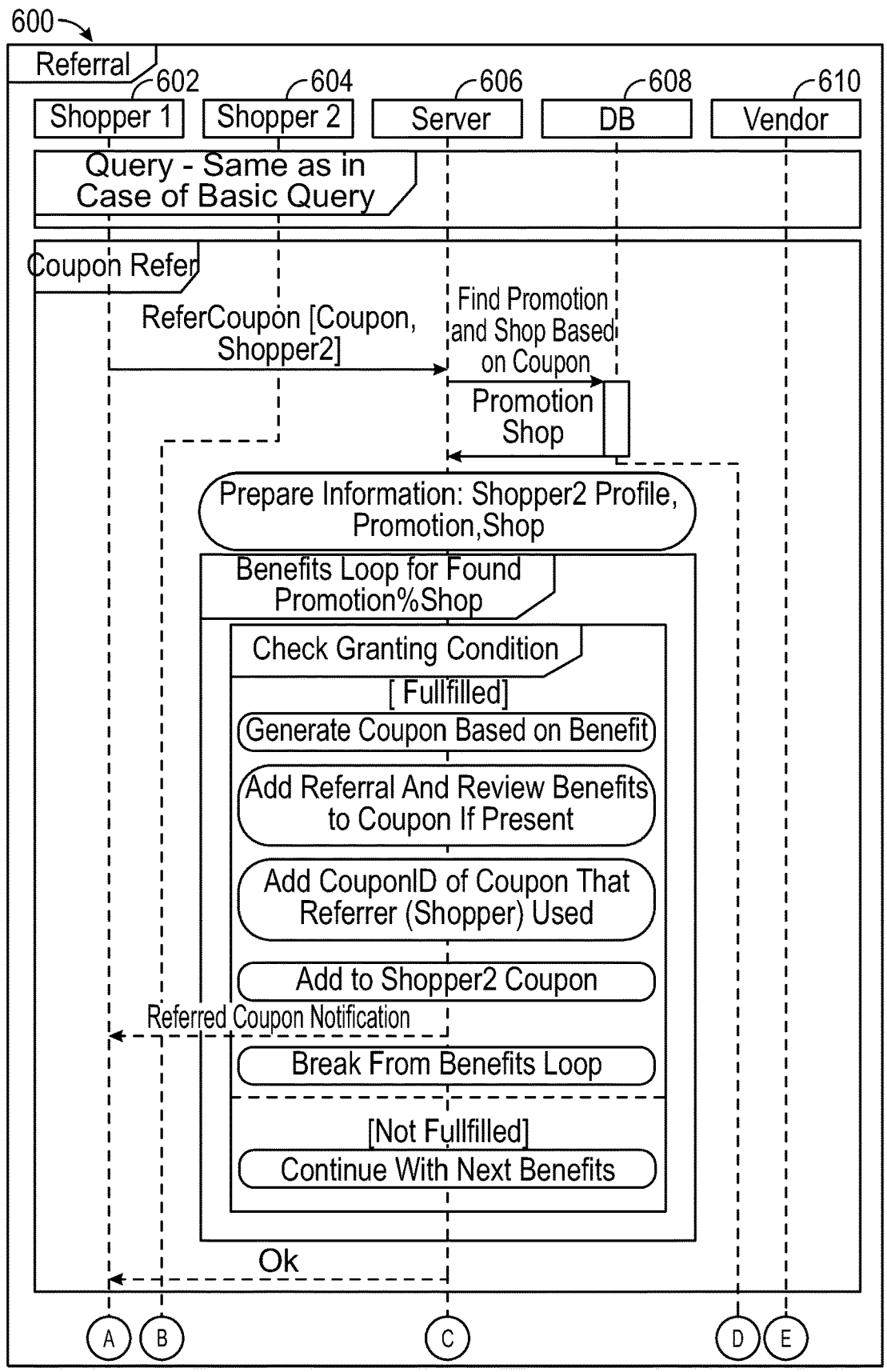
FIG. 6A illustrates an example of a flow diagram for a coupon referral according to some embodiments.
Figure 6B:
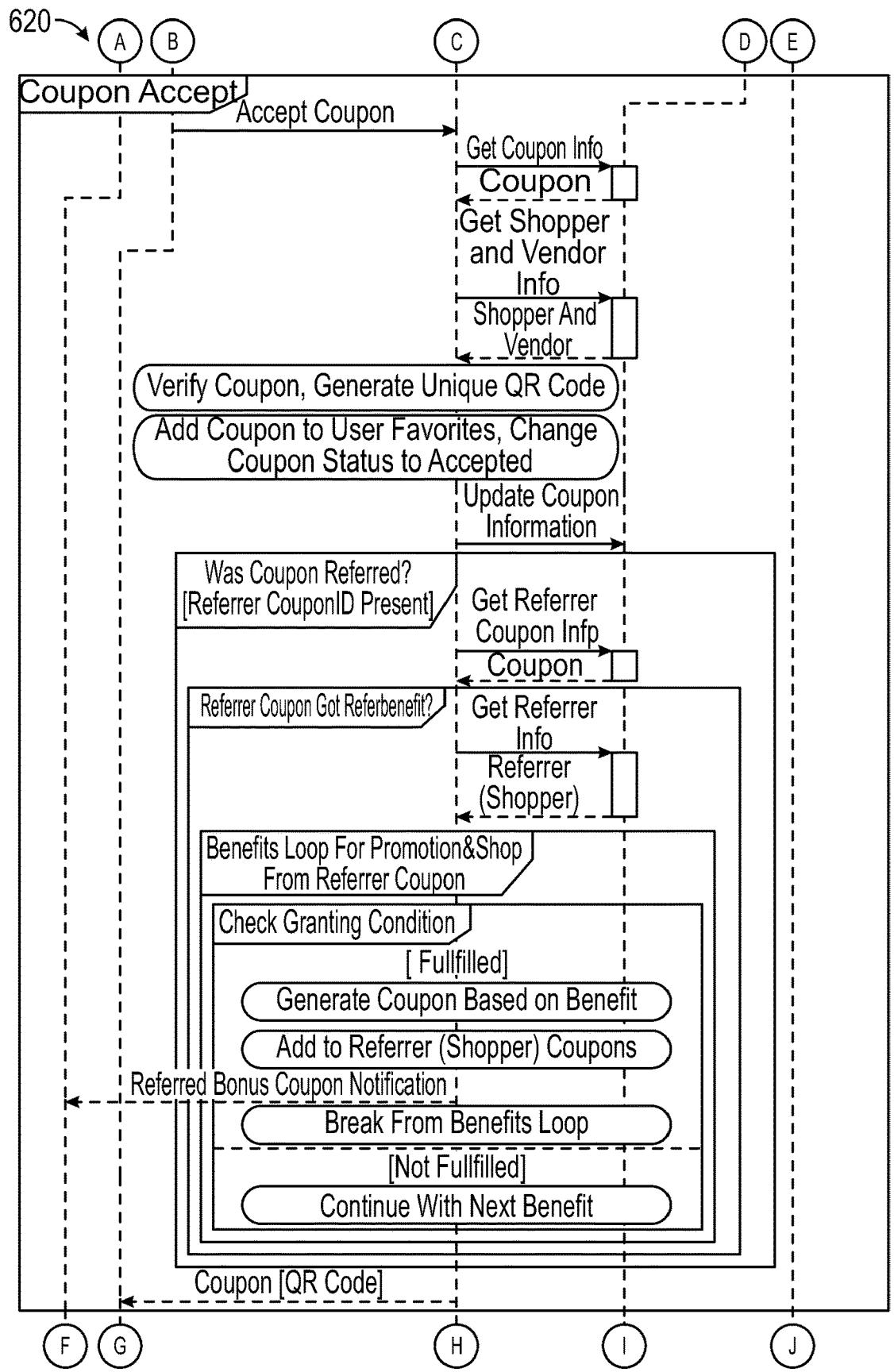
FIG. 6B illustrates an example of a flow diagram for a coupon accepted according to some embodiments.
Figure 6C:
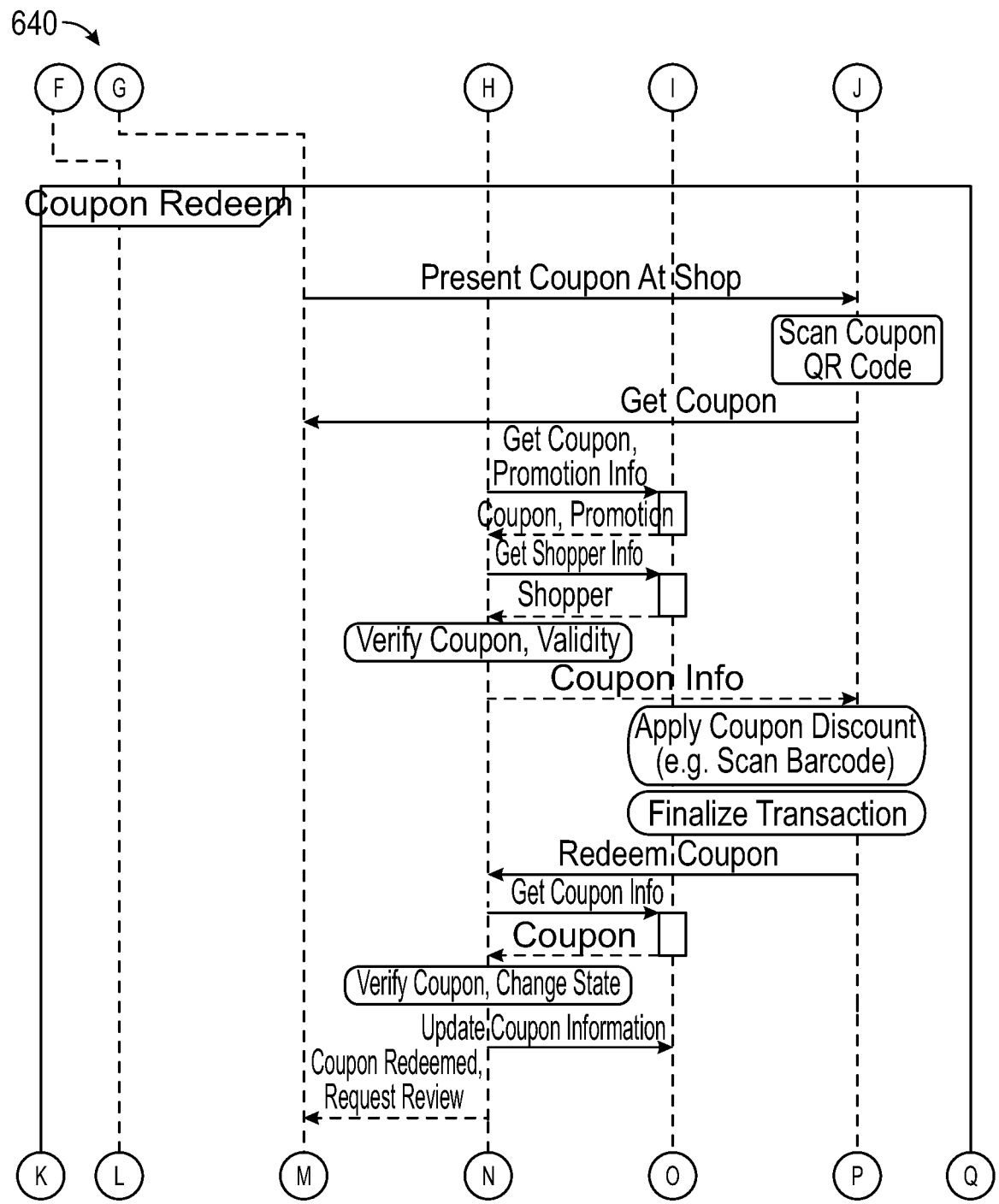
FIG. 6C illustrates an example of a flow diagram for a coupon redemption according to some embodiments.
Figure 6C:
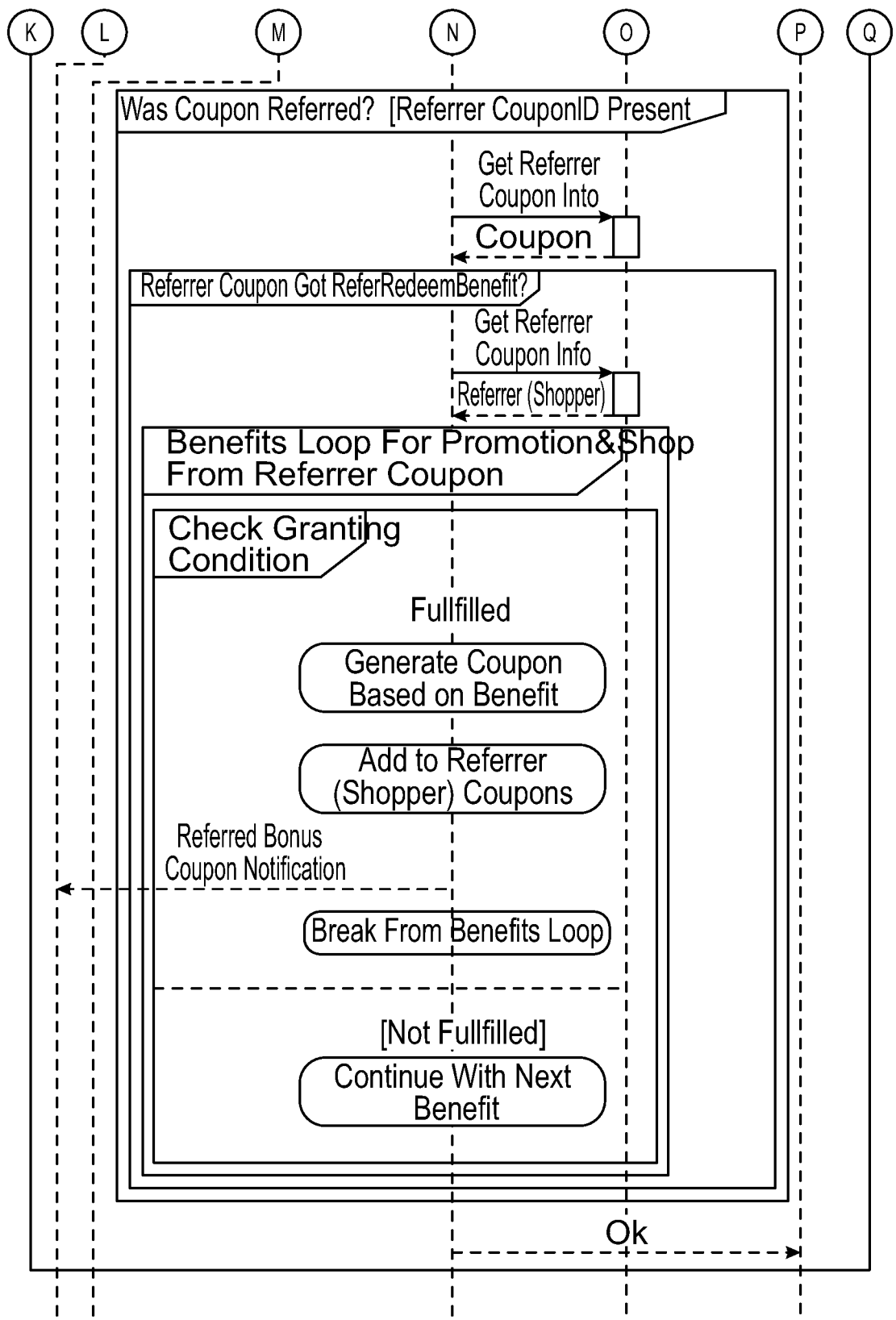

FIGS. 6A-6C illustrate examples of flow diagrams for shopper referrals according to some embodiments. In some embodiments, the shopper query flow diagram can include the same steps as in FIG. 5A.

FIG. 6A illustrates an example 600 of a flow diagram for a coupon referral according to some embodiments. First shopper 602 can request to refer a coupon to second shopper 604 to the server 606. The server 606 can request and receive the promotion for the coupon and for vendor information (e.g. shops) from the database 608 based on the received information from first shopper 602. The promotions may be different for referrals than for regular query responses, such as additional sets of benefits or different discount amounts. The server 606 can prepare the information to send the coupon to second shopper 604. In some embodiments, the first shopper 602 can select the type of benefit to receive and/or to send to the second shopper 604.

In some embodiments, the server 606 can begin a benefits loop for the identified promotions and vendors (e.g. shops) and check the granting conditions. If the granting conditions are met, the server 606 can generate a coupon based on the identified benefit, such as a percentage discount.

In some embodiments, the server 606 can add the referral benefits and/or review benefits if present. For example, if first shopper 602 wrote a review for the vendor, then first shopper 602 may get an additional benefit on top of the referral benefit.

In some embodiments, the server 606 can add the coupon identifier (e.g. coupon ID) the referrer (e.g. first shopper) for the referral benefit and add the actual coupons to second shopper 604.

In some embodiments, the server 606 sends the referred coupon to second shopper 604, and the server 606 breaks from the benefit loop to continue to the next benefit. If the check granting condition was not met, the server 606 can also break from the benefit loop to continue to the next benefit. The server 606 can indicate to the referrer first shopper 602 that the referral was completed to second shopper 604. The first shopper 602 can be informed as to the discounts and/or points that the shopper will receive based on the referral.

FIG. 6B illustrates an example 620 of a flow diagram for a coupon accepted according to some embodiments. The second shopper 604 that received the referral coupon can indicate to the server 606 of accepting the coupon with the vendor. The server 606 can then receive and request coupon information and shopper and vendor information from the database 608. The server 606 can verify the coupon, and generate a unique QR code for the referrer first shopper 602.

In some embodiments, the server 606 can indicate that the coupon has been accepted and add the coupon to second shopper 604's favorite list and update the coupon information with the database 608.

In some embodiments, the server 606 can identify whether the coupon was referred. If yes, the server 606 can request and receive referrer information from the database 608. Then the server can identify a referrer coupon by requesting and retrieving referrer information from the database 608 and beginning a benefits loop for the referrer coupon.

In some embodiments, the server 606 can check whether granting conditions were met for a benefit. If yes, the server 606 can generate a coupon based on the benefit, add the benefit to a referrer coupon, and send the bonus coupon notification to the referrer first shopper 602. The server can then break from the benefits loop and continue with the next benefit. If the granting conditions were not met for a benefit, the server can also then break from the benefits loop and continue with the next benefit.

In some embodiments, the server 606 can send the generated QR code to the second shopper 604 for the second shopper 604 to redeem the referred coupon.

FIG. 6C illustrates an example 660 of a flow diagram for a coupon redemption according to some embodiments. The referred first shopper 604 can present the coupon at a vendor shop. The vendor 610 can scan the coupon and send the coupon information to the server 606. The server can then request and receive coupon information and shopper information from the database 608 in order to verify the coupon.

In some embodiments, the server 606 can send the retrieved coupon information (such as a discount amount) to the vendor 610 for the vendor 610 to apply the coupon discount to the transaction with the second shopper 604.

In some embodiments, the vendor 610 can notify the server 606 that the coupon has been redeemed, the server 606 can request and receive the coupon information, and the server 606 can update the status of the coupon as redeemed with the database 608.

In some embodiments, the server 606 can request verification from the second shopper 604 of the redemption of the coupon and requesting review of such redemption. Advantageously, a coupon cannot be mistakenly redeemed.

In some embodiments, the server 606 identifies whether the coupon was referred in order to provide the referrer first shopper 602 with additional benefits of a redeemed coupon. If so, the server 606 requests and receives referrer information from the database 608.

In some embodiments, the server 606 begins a benefits loop for the referrer coupon and checks for a granting condition for the benefit. If the condition is met, the server 606 can generate a coupon based on the benefit, add the referrer coupon to a referrer message, and send the referrer message to the referrer first shopper 602 that includes the referrer redeemed coupon benefit. The server can then break from the benefits loop and continue with the next benefit. If the granting conditions were not met for a benefit, the server can also then break from the benefits loop and continue with the next benefit. In some embodiments, the server 606 can notify the vendor 608 of the completion of the referral coupon.

Example Communications Diagram Between System Database

Figure 7:
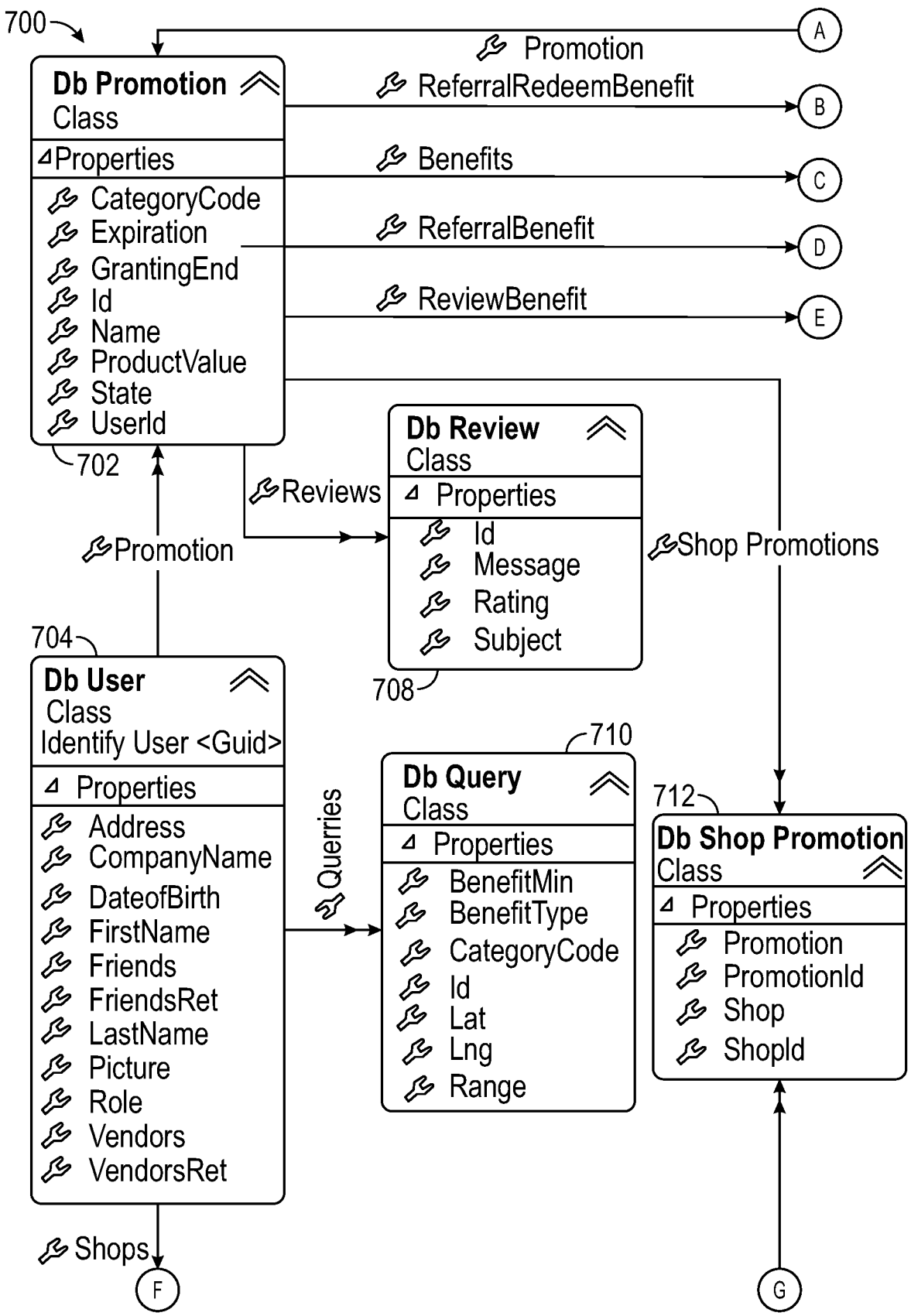
FIG. 7 illustrates an example of a communications diagram between system database tables, according to some embodiments.
Figure 7:
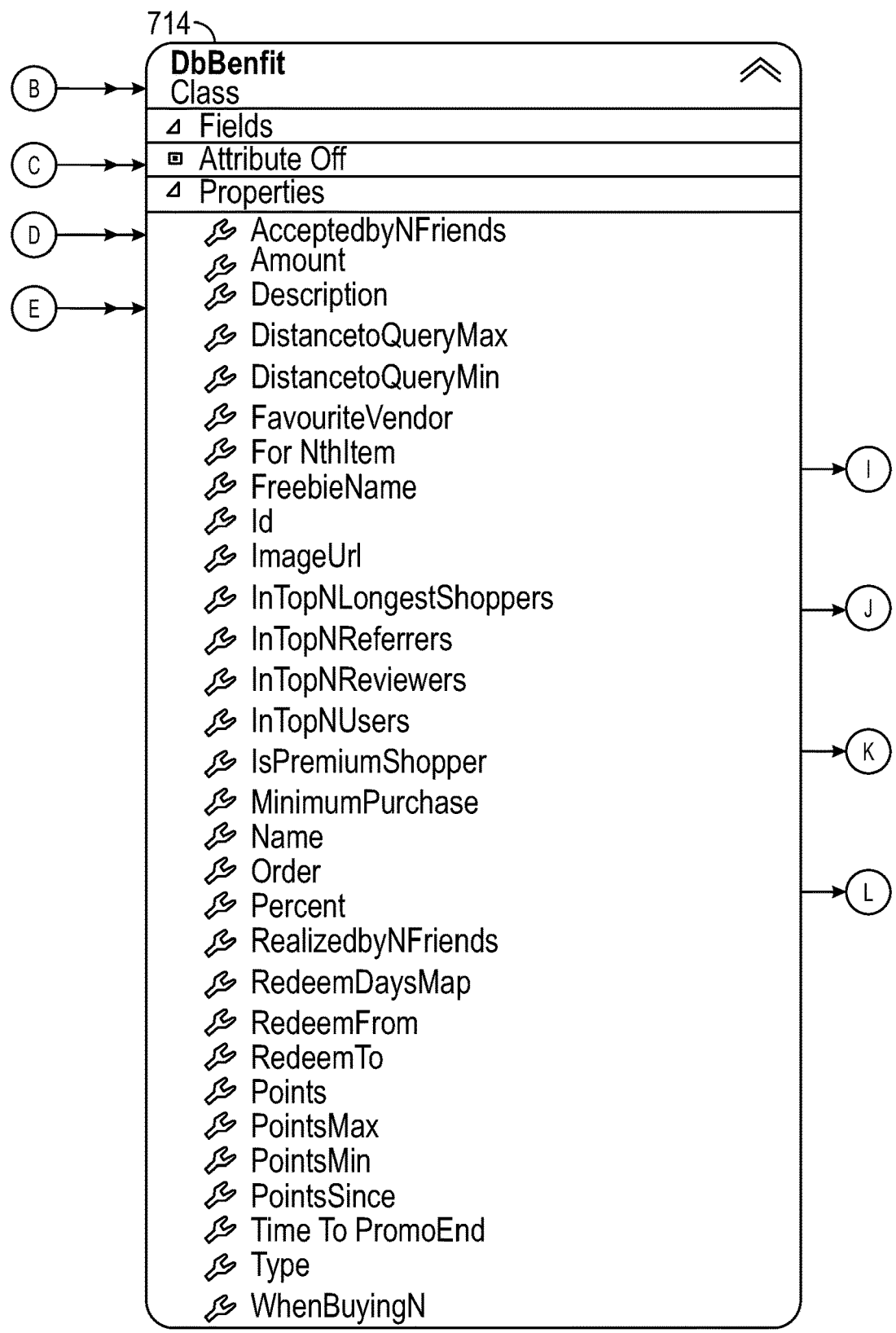
Figure 7:
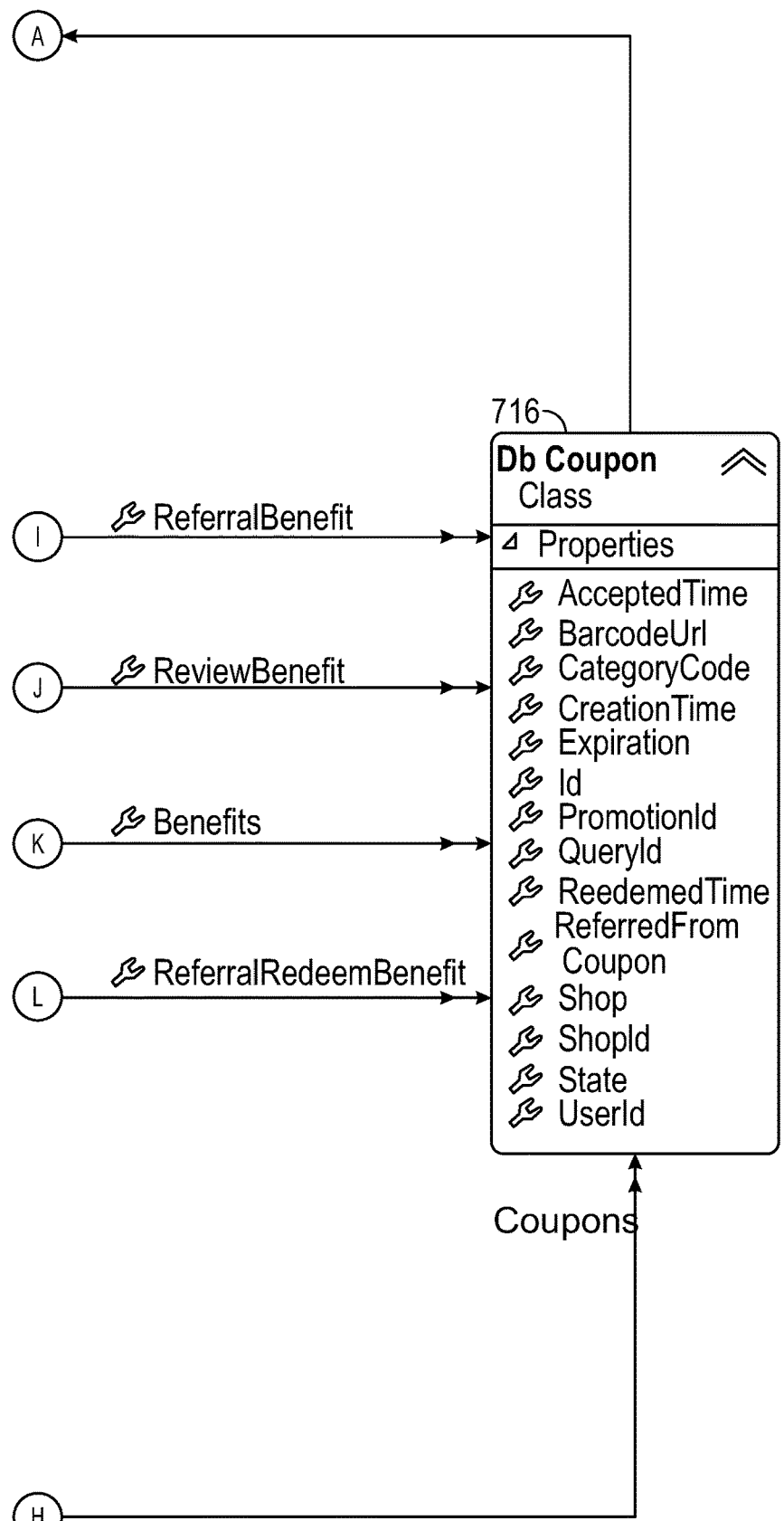
Figure 7:
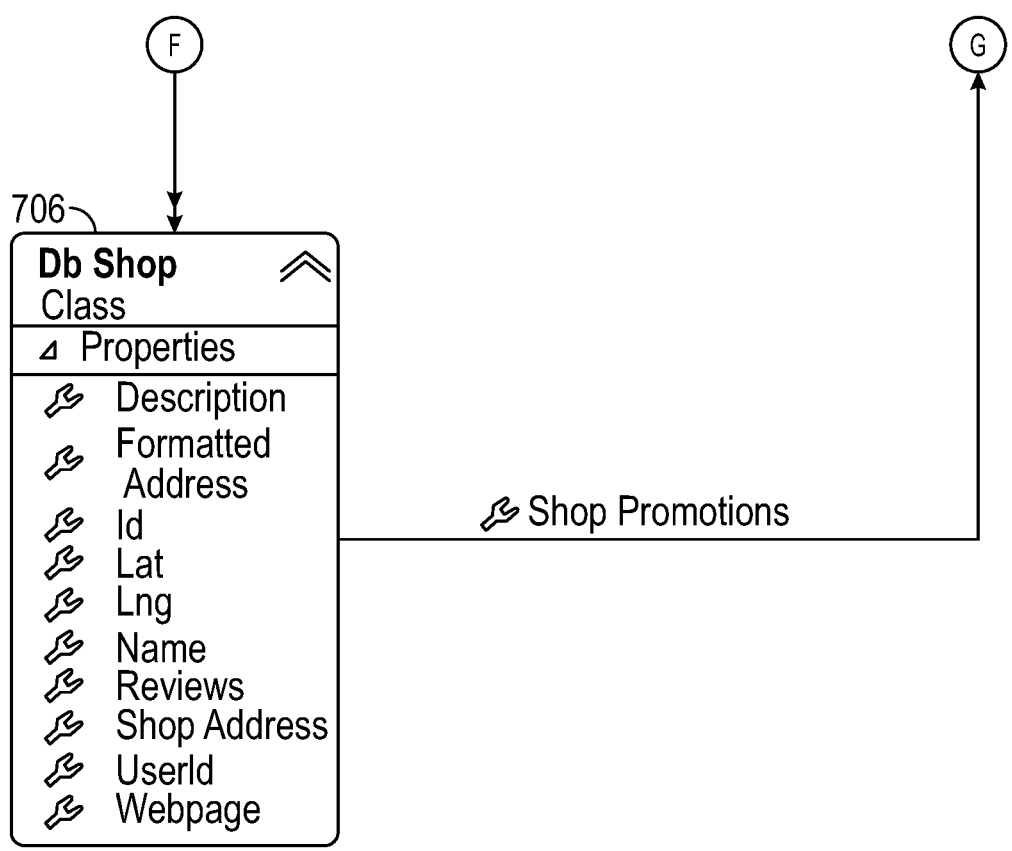

FIG. 7 illustrates an example 700 of a communications diagram between system database tables, according to some embodiments. The example of FIG. 7 includes a promotion database 702, a user database 704, a shop database 706, a review database 708, a query database 710, a shop promotion database 712, a benefit database 714, and a coupon database 716 (collectively referred to herein as databases). In the example of FIG. 7, the databases include SQL tables. However, it is appreciated that other databases can be used.

The promotion database 702 can include a database of promotions defined by vendors. Each promotion can include multiple benefits. The benefits can be grouped into certain categories, such as a query benefit, a referral benefit, a redeem benefit, a review benefit, and/or the like. The benefits can be used to generate coupons depending on certain situations, such as if the promotion is generated based on a user referring a coupon to another customer or a customer leaving a review for vendor.

The user database 704 can include a database of user profiles. The user profiles can include an authorization information for information associated with the user, such as credit information, personal identifiable information, and/or the like. The authorization can be authorization for the system to access and/or distribute the information. The user profile information can include authentication information, such as an identity authentication based on credit card verification. The profile data can be used for storing profiles for vendors and/or shoppers. The user profile data can include data related to shops, promotions, coupons, and/or queries, such as a user's preference for a type of coupon or a category of shops.

The shop database 706 can include a database of geographical location and description of vendor sites. For example, the database can include geolocations, a city, a state, a zip code, a webpage, and/or the like. The database can also include information regarding the shop, such as a category of goods and services, promotions offered, matching rules for the shop, and/or the like.

The review database 708 can include a database for storing user reviews, such as shopper reviews of the shop.

The query database 710 can include a database of shopper queries, such as shopper search terms, shopper search categories, and/or the like. The database can also include relevant information associated with the query, such as a time of day of the query, the weather, a geolocation where the query was made, and/or the like. The query information can be used for statistical analysis and/or for granting conditional usage of a coupon.

The shop promotion database 712 can include a database tying the promotions to the shops. For example, two shops can want a 20% discount for a customer that is a distance of 5 miles away and 30% discount for a customer that is 10 miles away, the shop promotion database 712 can link the coupons to the two shops.

The benefit database 714 can include a database of benefit descriptions, such as a discount amount, an amount of points granted for a vendor review, and/or the like. Granting conditions can be used to check if the coupon should be generated based on the benefit.

The coupon database 716 can include a database of generated coupons that point to granted benefits.

The databases include properties that can define the database entries. For example, the promotion database 702 can include a promotion name (e.g. "Mike's Car Wash Discount"), a promotion identifier (e.g. "CW123"), a promotion category (e.g. "Car Wash"), an expiration date of the promotion (e.g. "Jan. 3, 2019"), a state of the promotion (e.g. redeemed, pending, expired).

The databases and/or processors corresponding to the databases can communicate information among each other. In some embodiments, the relations between the tables can be self-referential tables. The self-referential tables can include a special row and/or column within the database that stores the pointers to the other tables. Instead of having to save the benefit characteristics for each of the coupons, the coupon database 716 can include an entry that refers to a benefit in the benefit database 714. Advantageously, the data stored in each of the databases can be reduced by calling a call function (e.g. a database pointer) when a certain data entry in another table is needed. Thus, client computing devices can perform modeling and have more flexibility in assessing large datasets, which previously required large network throughput of data and high processing speed. Moreover, a self-referential table can enable more efficient storage and retrieval of larger sized data, faster searching of the vouchers, promotions, and benefits, and more flexibility in configuring the database.

The executable instruction set can be generated and deployed to a client computing device (e.g. onto the downloadable electronic file) to automatically adjust the voucher parameters for the preferred outcome (e.g. the desired promotion). Advantageously, the voucher parameters that were previously stored in the client computing device can be automatically enhanced by the executable instruction set to perform according to the preferred outcome (e.g. increasing the previously set discount amount based on a user characteristic, query, location, and/or the like). The voucher parameters are subsequently and automatically enhanced by the executable instruction set to provide an output that is optimized and/or configured according to the preferred outcome. Thus, client computing devices can solves the technical problem of voucher generation across massive datasets via a practical application of a self-adjusting downloadable electronic file that automatically adjusts voucher parameters within the downloadable electronic file, which previously required large network throughput of data and high processing speed by having to move around the massive datasets for analysis.

In some embodiments, a database can communicate data in one direction, such as shown with a single arrowhead. For example, the coupon database 716 can communicate the referral benefit, the review benefit, the general benefit, and the referral and review combined benefit to the benefit database 714.

In some embodiments, a database can communicate multiple data files in one direction, such as shown by a double arrowhead. For example, the promotion database 702 can communicate a property of the coupons (e.g. referral and redeem benefits) that includes a collection of pointers to multiple entries in the benefit database 714.

In some embodiments, databases can communicate a collection of pointers to each other. For example, the shop promotion database 712 can communicate to multiple shops, and each shop may have multiple active promotions. Both the shop database 706 and the promotion database 702 can collect a collection of pointers for shop promotions at the shop promotion database 712.

Example Heat Map of Shopper Responses to Coupons

Figure 8:
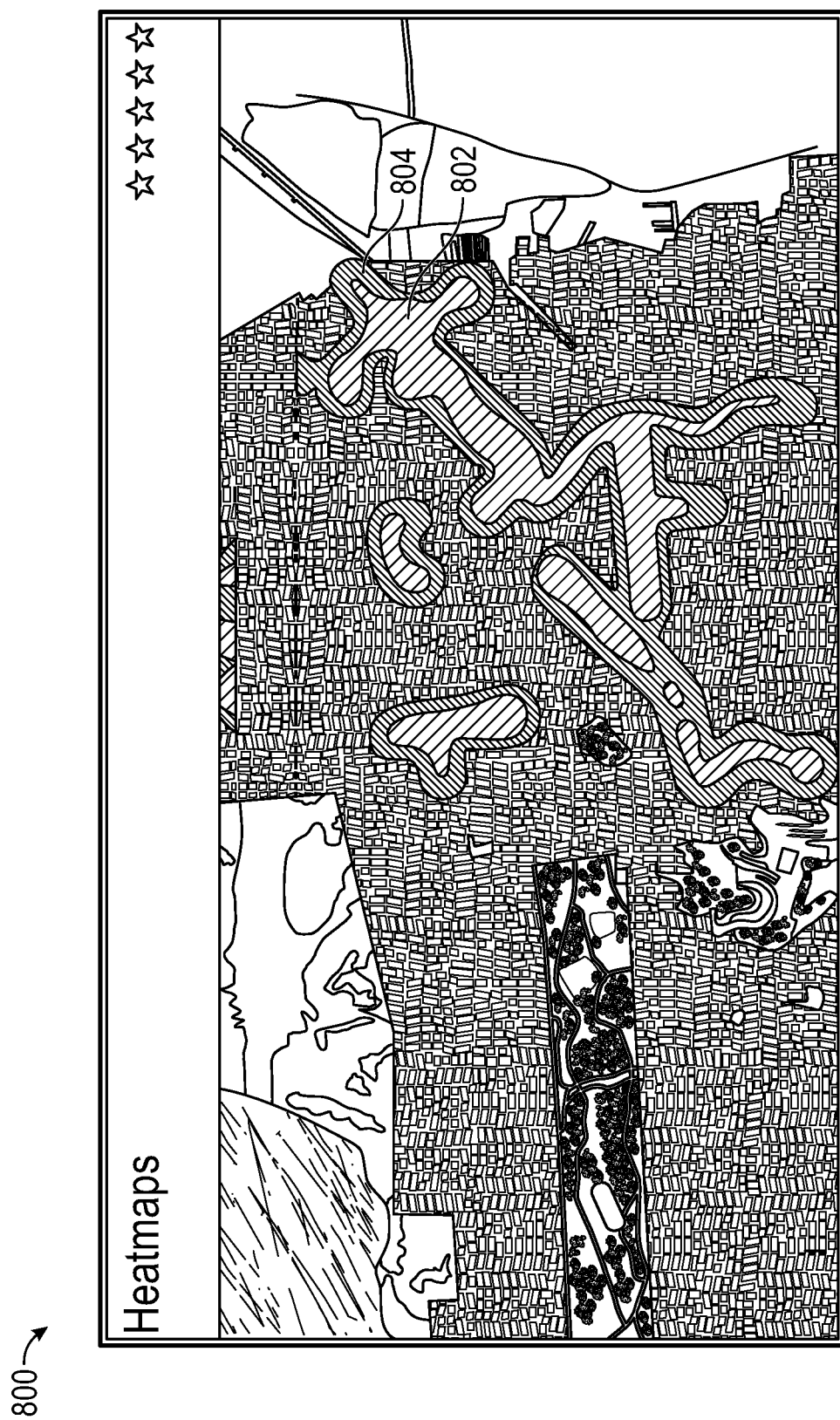
FIG. 8 illustrates an example of a heat map of shopper responses to coupons, according to some embodiments.

FIG. 8 illustrates an example 800 of a heat map for shopper responses to coupons, according to some embodiments. The heat map can include visual indicators that indicate where the shoppers are coming from. Thus, the heat map can show the vendors how to adjust their promotions to attract the appropriate shoppers from the areas of interest and/or other geographical areas.

The heat map can include a visual indicator 704 that indicates shoppers who have received coupons but not yet redeemed the coupons. The heat map can also include a visual indicator 702 of shoppers who have redeemed the coupons. The vendor can use the heat map to identify which promotions have the most impact on their sales and adjust the promotions accordingly to optimize sales. The visual indicators can indicate other characteristics of shoppers and/or vendors, such as shoppers who have queried for a particular coupon or shoppers who have referred a coupon to another shopper.

The heat map can illustrate how vendors should distribute sales, such as distributing sales to other vendor sites located in different geographical locations by adjusting promotions.

The heat map illustrates a specific graphical user interface that displays coupons received data and/or coupons redeemed data in a single view overlaid on a map.

The dynamic voucher generation and distribution system can generate a graphical user interface and/or graphical user interface data that optimizes valuable user interface real estate. For example, the dynamic voucher generation and distribution system can provide a display of a heat map of vouchers with visual indicators of vouchers that were distributed, redeemed, referred, and/or the like, and visual indicators of customers that have left reviews for the vendors. Such an improved display interface allows a user to more quickly access desired data stored in the mobile application and/or an external database. Moreover, the visual indicators can include a selectable function (e.g. a button, a summary list, text, radio button) that can launch one or more applications that provide further information to be seen. For example, the visual indicators on the heat map can be selected to display customer information corresponding to vouchers that were referred. Advantageously, the specific and practical manner of displaying the limited set of information to the user via a heat map improves the technical problem for the user interface in electronic devices over conventional systems by enabling the user to identify more relevant data based on geolocation, and more quickly select the relevant data to launch an application for more information related to the selection. Accordingly, the heat map and the visual indicators that correspond to functions that launch applications for more information improve the speed of the user's navigation through various views and windows. The user is saved from navigating to a table of voucher data, opening it up, navigating within the voucher data to identify data of interest and/or functions to be launched. Moreover, the user is saved from paging through multiple screens of options, where the heat map of the dynamic voucher generation and distribution system can enable the user to access the relevant data in response to a single view and a few clicks of the user.

Example Promotion Summary Graph

Figure 9:
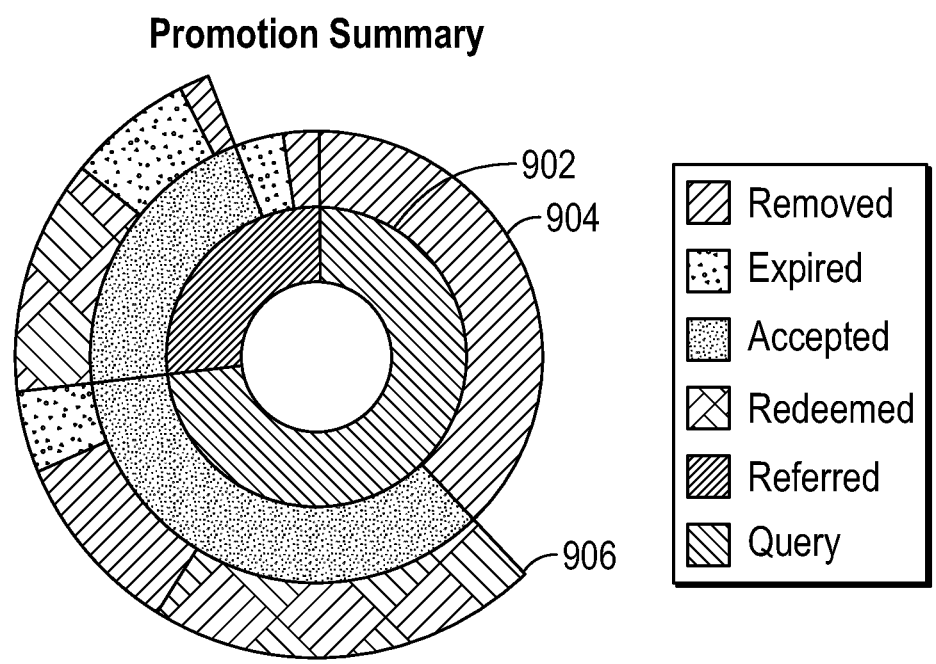
FIG. 9 illustrates an example of a promotion summary graph, according to some embodiments.

FIG. 9 illustrates an example 900 of a promotion summary graph, according to some embodiments. The promotion summary graph can illustrate a hierarchical promotion summary statistic graph, which can visualize coupon phases and amount of coupons that are accepted, redeemed, removed by the user, and/or expired.

The first hierarchy 902 can include coupons that are referred or queried. The coupons can be provided to the shopper based on a shopper query or if the coupon is referred to the shopper. The coupons can also be dynamically created, such as based on a close geolocation of the consumer to a vendor site.

The second hierarchy 904 can include coupons that were accepted, expired, or removed. In the example of FIG. 9, the queried coupons result in a large amount of accepted coupons and removed coupons, and no expired coupons. The referred coupons result in a large number of accepted coupons, and a small number of expired and removed coupons.

The third hierarchy 906 include results of the accepted coupons from the second hierarchy 904. Both the referred and query coupons that were accepted have a large number of redeemed coupons. The referred coupons have a larger percentage of expired coupons than those of the queried coupons. The queried coupons have a larger percentage of removed coupons than those of the referred coupons.

Example Distribution Time/Distance Diagram

Figure 10:
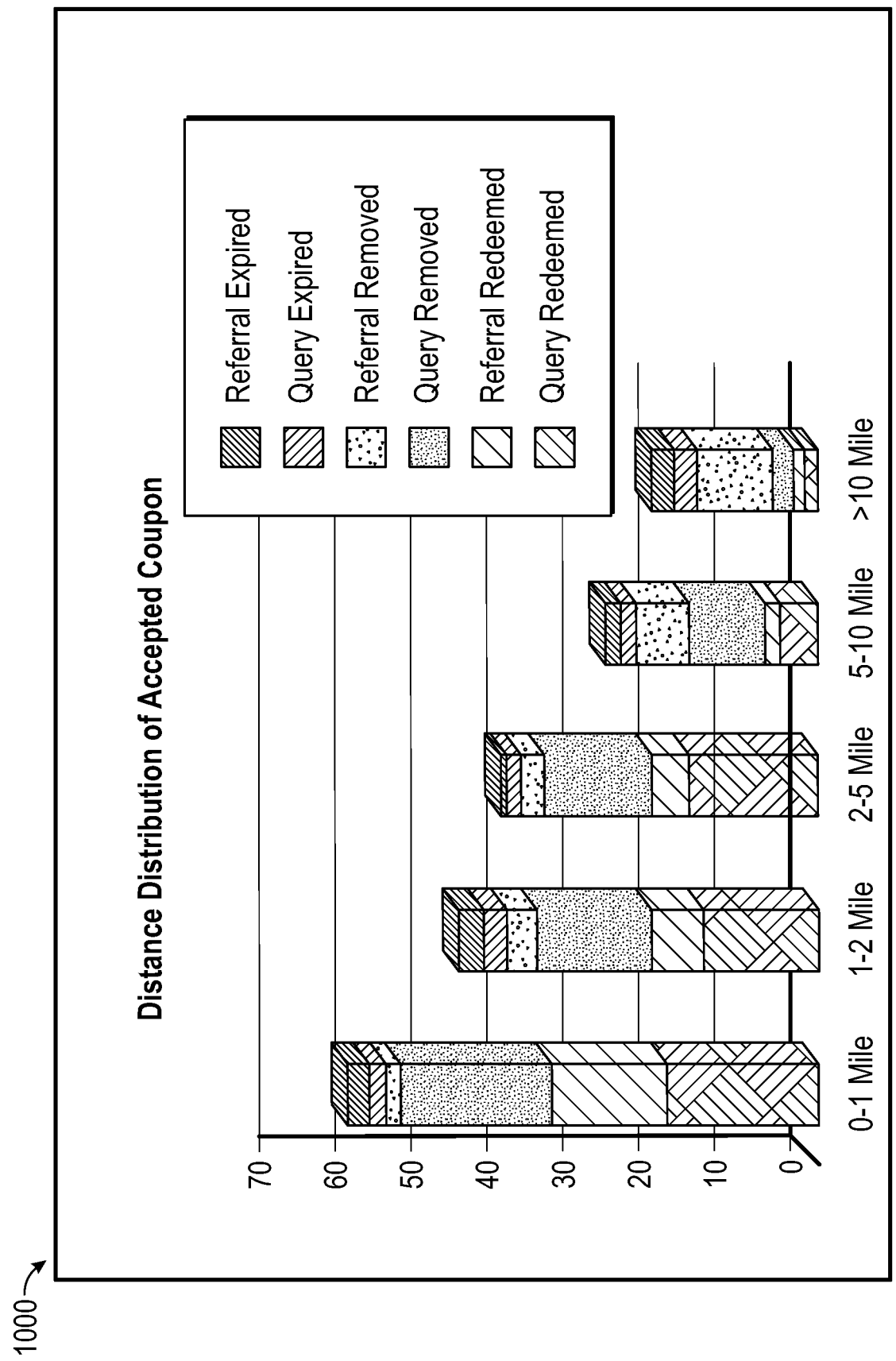
FIG. 10 illustrates an example of a distribution time/distance diagram, according to some embodiments.

FIG. 10 illustrates an example 1000 of a distribution distance diagram, according to some embodiments. In some embodiments, the distribution distance diagram can be displayed for other characteristics, such as queried coupons, referred coupons, dynamically created coupons, redeemed coupons, removed coupons, expired coupons, and/or the like, or a combination thereof. The distribution distance diagram of FIG. 10 illustrates coupons that were accepted.

The distribution distance diagram of FIG. 10 illustrates the effectiveness of a coupon over a distance. As shown, the query coupons that are redeemed drop in a large percentage from 2-5 to 5-10 miles. Thus, a vendor may decide to increase the discount amount starting from 5-10 miles. The distribution distance diagram can be used to improve ROI on a coupon and/or for statistical analysis on effectiveness of a coupon over distance.

In some embodiments, the diagram can be displayed over time. The number of accepted coupons can illustrate how fast certain coupons were accepted.

Example Benefits Usage Diagram

Figure 11:
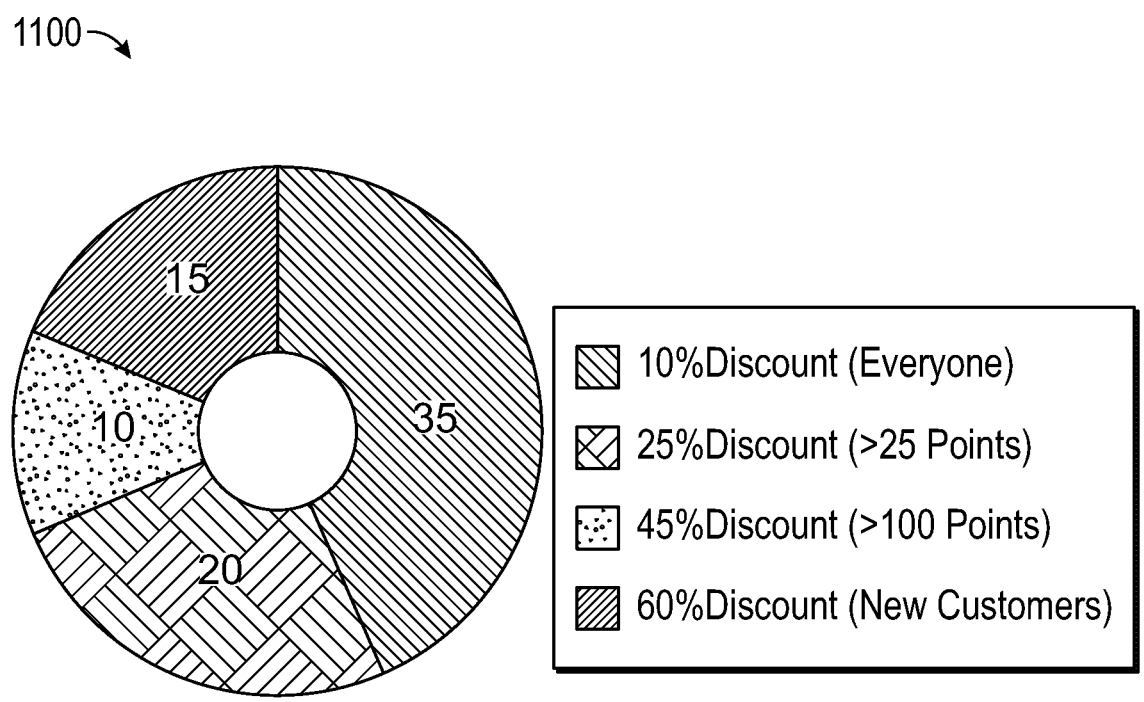
FIG. 11 illustrates an example of a benefits usage diagram, according to some embodiments.

FIG. 11 illustrates an example 1100 of a benefits usage diagram, according to some embodiments. The diagram provides a visual illustration of statistics of the levels of benefits used for a specific promotion. For example, the diagram can show the benefits of the percentage discount provided to the consumer. In the diagram of FIG. 11, the benefits illustrate a statistical distribution of coupons dispersed for a 10% discount, a 25% discount, a 45% discount, and a 60% discount. The 10% discount can be for all customers, in particular non-new customers with less than 25 loyalty points. The 25% discount can be provided to customers with loyalty points between 25 and 100 loyalty points. The 45% discount can be provided for customers with higher than 100 points. The 60% discount can be provided to new customers.

The diagram of FIG. 11 illustrates that the 10% discount is provided to a larger number of customers than any of the other discounts. The vendor can adjust their promotion strategy by assessing these statistics, as described further herein.

Example QR Code for Customer Scan

Figure 12:
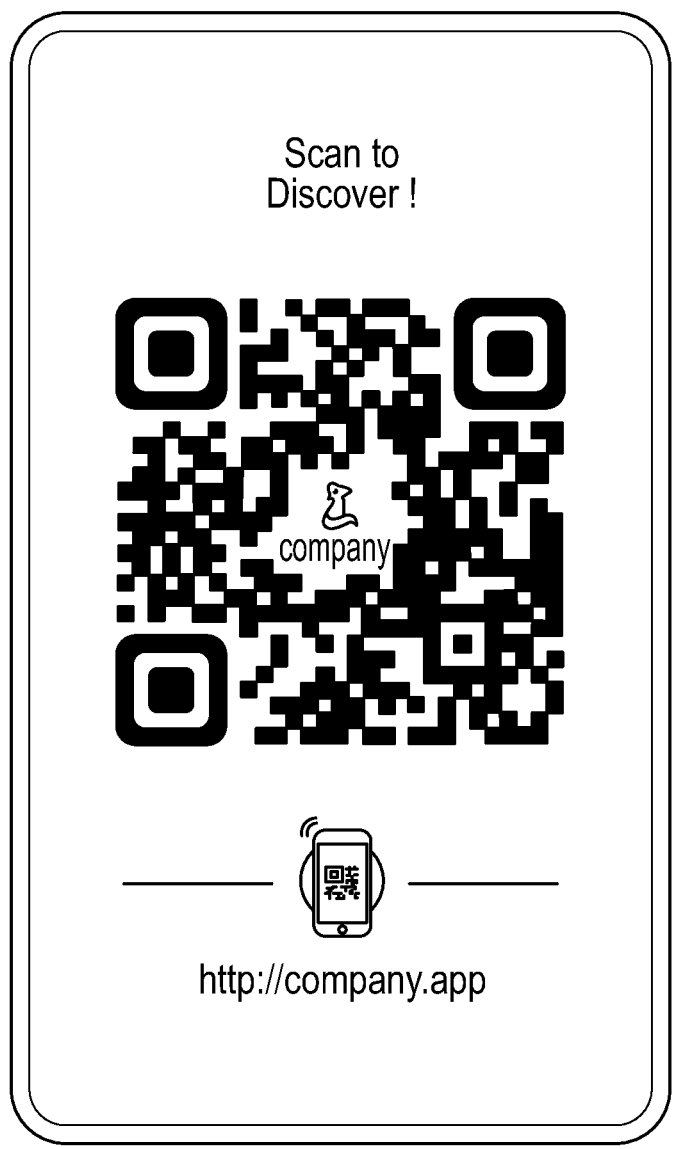
FIG. 12 illustrates an example of the QR code, according to some embodiments.

FIG. 12 illustrates an example 1200 of the QR code, according to some embodiments. In some embodiments, the QR code can be printed for a customer to scan. For example, the QR code can be printed on a poster and/or an electronic display at the front of a vendor site. Once the customer scans the QR code, such as via a customer's mobile device, an installed electronic file (such as an application) on the mobile device can process the QR code and provide a customized display interface for the consumer. For example, the electronic file may generate graphical user interface data that includes a personalized menu of discounts provided by the store just for the consumer. The personalized menu can take into accounts referrals sent, reviews written, loyalty points, and/or the like to provide customized promotions for the user. The electronic file can run a query based on a scanned QR code, where the query is narrowed to a specific shop and vendor.

In some embodiments, the QR code can be printed on a newspaper, physical mail, an electronic mail, sms message, billboard advertisement, advertisement printed on a car, and/or the like.

In some embodiments, the QR code can be printed on a product or a product shelf. When the consumer scans the QR code, the electronic file can generate customized pricing to be displayed to the consumer. Vendors can access the QR code for particular products by accessing specific product promotions. Vendors can access available promotions specific to a product and/or to a category of products. Specific product promotions can be marked as "in store only," which can make the promotion available only via the QR code on the product or on the product shelf. Vendors may use the vendor electronic file to generate the QR code label for the product.

In an illustrative example, the vendor can create a promotion with a set of benefits defining different product pricing based on loyalty points. Consumers with more loyalty points can be offered a higher discount or a better price. In some embodiments, loyalty points can be spent to upgrade a particular promotion. The upgrade option can be displayed on the mobile device of a consumer via the electronic file.

In some embodiments, the QR code can be generated for a particular product (e.g. a serial number of shoes). The QR code can be specific to a group of products (e.g. refurbished items or new items). The QR code identifying a product or a group of products can be provided by the vendor to the system. A sticker printer can print the QR codes to be placed on the product, on a product shelf, on a poster wall, and/or the like. In some embodiments, a digital screen can display the QR codes. The electronic file can process the scanned QR codes and allow tracking for returned items or items where the consumer is requesting warranty.

In some embodiments, the consumer can be displayed a customized and personalized price in response to scanning the QR code. The consumer can register the credit card with the system beforehand, and can have the option to pay for the product directly via the electronic file installed on the consumer device. The electronic file can cause display of notification with receipt and confirmation identifier (e.g. another QR code) that can be used by the vendor to verify the transaction. The vendor can scan the confirmation identifier to get transaction details from the system.

In some embodiments, the vendor can scan the coupon using the vendor electronic file and request the system to complete the transaction. The consumer can get notification on the consumer's electronic file that the transaction was completed. The system can request money transfer from the consumer's credit card to the vendor's payment system and notify both the vendor and the consumer upon completion of the payment transfer.

In some embodiments, the QR code can identify one or more products and/or actions. For example, a QR code can indicate a product, a category of products, a shop, a benefit, a particular promotion, a specific query, and/or the like.

In some embodiments, the QR code can be scanned and the system can identify a vendor profile based on the scanned QR code. System can then retrieve a list of coupons for the identified vendor and send the coupons to the user.

In some embodiments, a QR code can be scanned and the system can identify a specific vendor location. The QR code can be displayed in front of a vendor store such that a user can scan the code and identify relevant coupons available for the store. In some embodiments, the QR code can be scanned offsite, and the system can identify and display the location of the vendor site where the coupon can be redeemed.

In some embodiments, the QR code can be scanned, and the system can identify a specific vendor's promotion. The promotion can be displayed to the user and/or can be printed, an internet coupon that can be redeemed by displaying a barcode on the user device (e.g. via a downloadable file installed on the user device), and/or the like. For example, the consumer device can display an advertisement on a search engine stating "scan here to check our pizza discount for you."

In some embodiments, the coupon can be printed onto a newspaper, coupon book, advertisement to be physically mailed to the user, displayed as an internet advertisement, sent via electronic mail, and/or the like. The coupon can be a general promotion and/or a customized promotion for the individual.

Augmented Reality and Virtual Reality Devices

In some embodiments, the system can send coupons to an augmented reality system, a virtual reality system, and/or the like. A user can use the downloadable file on the augmented reality system to look through a lens, camera, and/or the like. The promotion can be displayed on top of a newspaper, where the promotion can be displayed as a virtual coupon displayed on top of a physical newspaper. In some embodiments, the augmented reality system, virtual reality system (VR/AR), and/or the like can include AR/AR glasses, VR/AR lenses, VR/AR camera, VR/AR headset, and/or the like. The VR/AR device can enable scanning multiple QR codes at once in real time. In some embodiments, the VR/AR device can display and/or print the promotions on top and/or near the QR codes. For example, a user can view a coupon book with multiple coupons via the VR/AR device, and the VR/AR device can display multiple offers at once, each offer adjusted for the specified user's profile. The user can select the virtual discount via an input, such as by tapping on the coupon or controlling a pointer, to accept the coupon.

In some embodiments, the VR/AR device can display door posters at a vendor site, such as adjusted pricing of a restaurant menu for a specific shopper.

Consumer and Consumer Group Rating

In some embodiments, the consumer and/or consumer group rating can include an abstract value or set of values associated with each consumer or consumer group calculated based on one or more of, but not limited to:
consumer history of realized vouchers
history of realized vouchers that consumer forwarded to others
reviews and feedback provided by consumer that was rated as helpful by others
History of purchase transactions associated with realized vouchers like:
original price
discounted price
product category
time of transaction
location of transaction Rating of the consumer group can be calculated based on ratings of its members and/or vice versa. Dynamically calculated rating value can be broken down by category, origin (realized vouchers, referrals, feedback), time and location, and/or the like.

The rating of the consumer or consumer group can be normalized across a plurality of suppliers. For example, the ratings of the consumer or consumer groups can be normalized based on the transaction price and the discounted price. Furthermore, other transaction parameters can be used to normalize as well as to categorize or break down consumer or consumer group rating. For example, the supplier can include a rule that filters consumers with ratings above 100 only considering vouchers for electronic equipment from stores in California realized during the last month. Rating points can be gathered by consumers by realizing vouchers (e.g., $100 spent on discounted articles). Rating points can be also gathered by referrals, reviews, and/or the like.

In-Person Voucher Distribution

In some embodiments, suppliers using near-field communication ("NFC"), Bluetooth or other location limited technology can distribute vouchers to consumers that physically visited premises. Such vouchers can be passed using a dedicated application such as a mobile application. Vendors granting coupons can include NFC devices to connect with a mobile phone in the vendor's store. The vendor systems can include systems for employees with NFC communication triggers for consumers to query for promotions. In some embodiments, certain benefits can only be accessed in-store using NFC devices.

Favorite Supplier Proximity Trigger for Voucher Query

In some embodiments, consumers can build a list of favorite suppliers for which voucher query will be generated based on consumer location proximity to the supplier's premises. Consumer will be notified once the vouchers are generated and ready to use. This feature can eliminate the need to search for vouchers for the specified suppliers. The coupon query can be automatically triggered by a consumer device when within a certain distance threshold to a vendor site.

Supplier Loyalty Program Plugin

In some embodiments, consumers can extend his or her profile with a supplier's existing loyalty program where she or he is a member. Loyalty program ID can be stored in consumer database and used in the voucher queries as well as during voucher realization. Consumer loyalty program ID can be verified on supplier's server before it is stored in consumer profile.

In some embodiments, consumers can receive points for completing a transaction with a supplier. For example, a consumer can receive a 50% off for their first offer and 20 points to their loyalty program. Any consumer with 100+ points can get a 25% discount for future offers. Consumers who refer the supplier to other consumers can receive 5 points for their referral. If the referred shopper realized a coupon, the referrer shopper can receive an additional $10 off his or her next service of greater than $30. Loyalty points can also be applied to a shopper when the shopper completes a review for the vendor. Loyalty points can be spent by a shopper to upgrade a specific coupon already received from a query and/or referral to the next benefit level in the same promotion.

Plugin for Supplier Bar Code Scanner

In some embodiments, software plugins to bar code scanner equipment can provide automated feedback related to realized vouchers and the associated transactions along with regular product bar-code scan. Such systems can combine the step of voucher verification with product/service purchase. Advantageously, automatic detection of product returns can be fed back to the system.

Wish List

In some embodiments, consumers can specify wish lists as a list of products or categories of interest. Mobile applications can automatically query and notify consumer about vouchers fulfilling specified criteria. Queries can be triggered based on time (periodic) or based on location (when consumer change the location). After a vouchers list is built, the system application can provide tools to compare the benefits based on additional parameters (e.g., 20% off vs. $50 off based on specified product price). The consumer can search for special offers nearby for a longer period of time and/or be notified every time a new, better offer shows up.

In some embodiments, the wish list can include a shopper's favorite query and/or sets of queries that can be stored by the shopper's mobile device and/or the server. The mobile device can process the queries to trigger queries to the server at certain time periods and/or based on a proximity trigger. The server can process the queries to check on any new matching promotions to add to the generated coupons for the shopper.

Shopping List

In some embodiments, consumers can build a query that span multiple categories and/or products and send to the system as one request. As a response, system can send geographically grouped sets of vouchers that can be compared, such that consumer can choose the place of interest, such as a place for shopping.

Pay with the Voucher

In some embodiments, suppliers can grant unique, single consumer dedicated vouchers for consumers that connect their credit card information with the profile. Consumer can have possibility to pay for the product/service with the voucher itself. Money transfer can be done directly from consumer's registered credit card to supplier account and transaction confirmation will be sent to both consumer and supplier app. The system can verify a consumer's identify based on credit card information, and can indicate to a content item provider of the consumer identify verification.

Short Validity Flash Vouchers

In some embodiments, the dynamic voucher generation and distribution system can generate short validity flash vouchers. Higher benefit vouchers can be generated for sports events, movies at a theater or concerts in response to queries issued few hours before the event and with very short validity. Flash vouchers can be useful to fill in the empty spots last moment.

Universal Vouchers

In some embodiments, supplier can query for a top number of consumers to send discount vouchers or referral benefit vouchers (e.g., forward to friends, get $10 discount once they use it) to their consumers.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
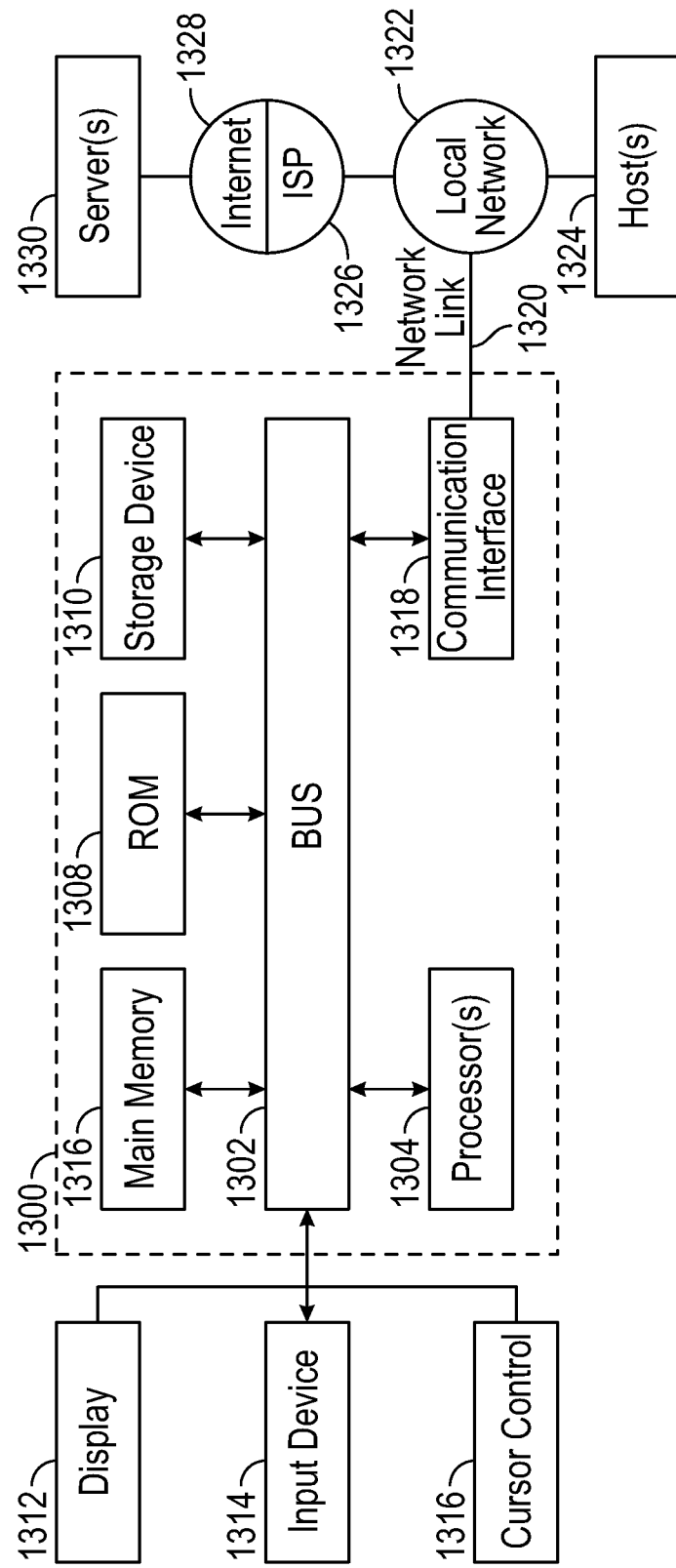
FIG. 13 illustrates a computer system with which certain methods discussed herein may be implemented.

For example, FIG. 13 is a block diagram that illustrates a computer system 1300 upon which an embodiment may be implemented. Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

Computer system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Example forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or wide area network (WAN) component to communicated with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for data integration of geolocation information of a mobile computing device from a downloadable electronic file, the method comprising:

receiving a first downloadable electronic file by a mobile computing device, wherein the mobile computing device includes a global positioning system;

installing the first downloadable electronic file;

receiving an indication of completion of the installation of the first downloadable electronic file on the mobile computing device;

identifying a threshold radius of a location for a content provider system;

receiving, via the installed first downloadable electronic file, a geolocation of the mobile computing device, wherein the first downloadable electronic file receives geolocation data from the global positioning system of the mobile computing device and determines the geolocation based on the received geolocation data;

in response to determining that the geolocation of the mobile computing device is within the threshold radius of the content provider system:

accessing content items for the content provider system and corresponding matching rules;

determining a distance between the mobile computing device and the location for the content provider system;

accessing a profile for the mobile computing device including historical conversion rates information for a user of the mobile computing device corresponding to the determined distance, wherein the historical conversion rates information includes at least a first historical conversion rate for a first percentage discount and a second historical conversion rate for a second percentage discount, wherein the first percentage discount is lower than the second percentage discount;

determining that the first historical conversion rate is above a predefined value;

in response to determining that the first historical conversion rate is above the predefined value:
applying the matching rules to the profile to identify one or more matched content items for the mobile computing device;
adjusting a percentage discount of the identified one or more matched content items based on the first percentage discount;
launching an application corresponding to the installed first downloadable electronic file that is in an unlaunched state to provide a notification regarding the identified one or more matched content items; and
displaying a map including a visual indicator of the matched content items, the adjusted percentage discount, and the geolocation of the mobile computing device.

2. The method of claim 1, further comprising:
receiving an redemption indication of at least one of the one or more matched content items from a second downloadable electronic file installed on the corresponding content provider system, wherein the content provider system receives a signal from the mobile computing device via a near field communication antenna or Bluetooth.

3. The method of claim 1, wherein transmitting the one or more matched content items to the mobile computing device with the adjusted percentage discount occurs in substantially real-time of identifying one or more matched content items for the mobile computing device.

4. The method of claim 1, wherein the one or more matched content items is a voucher.

5. The method of claim 1, wherein the percentage discount is further based on at least one of: a content provider rating, the user of the mobile computing device rating, loyalty points, a voucher referral, a voucher redemption, or a voucher received.

6. The method of claim 1, wherein the conversion rate is retrieved via an API call and wherein the map further includes visual indicators of distributed, redeemed, and referred content items, and of reviewed content providers.

7. A system for data integration of geolocation information of a mobile computing device from a downloadable electronic file, the system comprising:
one or more processors in communication with at least one electronic data store and configured to at least:
receive a downloadable electronic file by a mobile computing device, wherein the mobile computing device includes a global positioning system;
install the downloadable electronic file;
receive an indication of completion of the installation of the downloadable electronic file on the mobile computing device;
identify a threshold radius of a location for a content provider system;
receive, from the installed downloadable electronic file, a geolocation of the mobile computing device, wherein the downloadable electronic file receives geolocation data from the global positioning system of the mobile computing device and determines the geolocation based on the received geolocation data;
in response to determining that the geolocation of the mobile computing device is within the threshold radius of the content provider system:
access content items for the content provider system and corresponding matching rules;
determine a distance between the mobile computing device and the location for the content provider system;
access a profile for a user of the mobile computing device including historical conversion rates information for the user corresponding to the determined distance, wherein the historical conversion rates information includes at least a first historical conversion rate for a first percentage discount and a second historical conversion rate for a second percentage discount, wherein the first percentage discount is lower than the second percentage discount;
determine that the first historical conversion rate is above a predefined value; and
in response to determining that the first historical conversion rate is above the predefined value:
apply the matching rules to the profile to identify one or more matched content items for the mobile computing device;
adjust a percentage discount of the identified one or more matched content items based on the first percentage discount;
launch an application corresponding to the installed downloadable electronic file that is in an unlaunched state to provide a notification regarding the identified one or more matched content items; and
display a map including a visual indicator of the matched content items, the adjusted percentage discount, and the geolocation of the mobile computing device.

8. The system of claim 7, wherein the one or more processors are further configured to facilitate a payment transaction between the content provider system and the mobile computing device without providing financial information associated with a user of the mobile computing device to the content provider system.

9. The system of claim 7, wherein the at least one electronic data store includes a first data store storing call functions for data in a second data store, and wherein the one or more processors are further configured to display a promotion summary graph of coupons accepted, redeemed, removed, and expired and configured to display a distribution distance graph of accepted coupons over two or more distances.

10. The system of claim 7, wherein a scanner of the content provider system is configured to scan the one or more matched content items displayed on the mobile computing device, and wherein at least one of the one or more matched content items include a QR code.

11. A non-transitory computer storage medium storing computer-executable instructions that, when executed by a processor, cause the processor to perform the following method:
receive a downloadable electronic file by a user computing device, wherein the user computing device includes a global positioning system;
install the downloadable electronic file;
receive an indication of completion of the installation of the downloadable electronic file on the user computing device;
receive, from the installed downloadable electronic file, a geolocation of the user computing device, wherein the downloadable electronic file receives geolocation data from the global positioning system of the user computing device and determines the geolocation based on the received geolocation data;
identify a threshold radius of a location for a content provider system;
   in response to determining that the geolocation of the mobile computing device is within the threshold radius of the content provider system:
      access content items for the content provider system and corresponding matching rules;
      determine a distance between the mobile computing device and the location for the content provider system;
      access a profile associated with the user computing device including historical conversion rates information for the user corresponding to the determined distance, wherein the historical conversion rates information includes at least a first historical conversion rate for a first percentage discount and a second historical conversion rate for a second percentage discount, wherein the first percentage discount is lower than the second percentage discount;
      determine that the first historical conversion rate is above a predefined value; and
      in response to determining that the first historical conversion rate is above the predefined value:
         apply the matching rules to the profile to identify one or more matched content items for the user computing device;
         adjust a percentage discount of the identified one or more matched content items based on the first percentage discount;
         launch an application corresponding to the installed downloadable electronic file that is in an unlaunched state to provide a notification regarding the identified one or more matched content items; and
         display a map including a visual indicator of the matched content items, the adjusted percentage discount, and the geolocation of the mobile computing device.

12. The non-transitory computer storage medium of claim 11, wherein the matching rules include a query for a type of content item.

13. The non-transitory computer storage medium of claim 11, wherein the method can further comprise the following: receive a request to send one of the matched content items to another user computing device.

* * * * *